US008582606B2

(12) United States Patent
Pignatelli

(10) Patent No.: US 8,582,606 B2
(45) Date of Patent: Nov. 12, 2013

(54) NETWORK SYSTEM WITH SYNCHRONIZATION AND METHOD OF OPERATION THEREOF

(75) Inventor: David J. Pignatelli, Saratoga, CA (US)

(73) Assignee: Cortina Systems, Inc., Sunnyvale, CA (US)

(*) Notice: Subject to any disclaimer, the term of this patent is extended or adjusted under 35 U.S.C. 154(b) by 681 days.

(21) Appl. No.: 12/786,218

(22) Filed: May 24, 2010

(65) Prior Publication Data

US 2011/0286560 A1  Nov. 24, 2011

(51) Int. Cl.
*H04J 3/06* (2006.01)
*G06F 1/10* (2006.01)

(52) U.S. Cl.
USPC .............. 370/503; 370/516; 375/356

(58) Field of Classification Search
None
See application file for complete search history.

(56) References Cited

U.S. PATENT DOCUMENTS

| | | | | |
|---|---|---|---|---|
| 3,931,575 | A * | 1/1976 | Amoroso, Jr. | 455/75 |
| 5,499,275 | A * | 3/1996 | Kishi | 375/357 |
| 5,579,513 | A * | 11/1996 | Strohmer | 713/600 |
| 5,754,535 | A * | 5/1998 | Vandenabeele et al. | 370/321 |
| 6,898,235 | B1 * | 5/2005 | Carlin et al. | 375/219 |
| 7,181,142 | B1 | 2/2007 | Xu et al. | |
| 7,602,800 | B2 | 10/2009 | Endo et al. | |
| 2005/0165989 | A1 * | 7/2005 | Kim | 710/260 |
| 2010/0040369 | A1 | 2/2010 | Zhao et al. | |
| 2010/0054739 | A1 * | 3/2010 | Lavillonniere et al. | 398/67 |
| 2010/0085989 | A1 * | 4/2010 | Belhadj et al. | 370/503 |
| 2010/0209070 | A1 * | 8/2010 | Inomata | 386/66 |

OTHER PUBLICATIONS

IEEE Instrumentation and Measurement Society, IEEE Standard for a Precision Clock Synchronization Protocol For Networked Measurement And Control Systems, Sponsored by the Technical Committee on Sensor Technology (TC-9), Jul. 24, 2008, 269 pages.
Audio/Visual Bridging Task Group of IEEE 802.1. IEEE P802.1AS/D6.6, Clause 13, Draft Standard for Local and Metropolitan Area Networks—Timing and Synchronization for Time-Sensitive Applications in Bridged Local Area Networks. Sponsor: LAN/MAN Standards Committee of the IEEE Computer Society, Dec. 21, 2009, 208 pages.

* cited by examiner

*Primary Examiner* — Xavier Szewai Wong
(74) *Attorney, Agent, or Firm* — Ishimaru & Associates LLP

(57) ABSTRACT

A method of operation of a network system including a network line terminal coupled to a slave network unit and a master network unit over a first network includes: calculating a master round trip time between the network line terminal and the master network unit; sending a master message to the slave network unit, the master message having the master round trip time and a master local time; and calculating a slave local time based on the master round trip time and the master local time.

48 Claims, 15 Drawing Sheets

NETWORK SYSTEM WITH SYNCHRONIZATION AND METHOD OF OPERATION THEREOF

TECHNICAL FIELD

The present invention relates generally to a network system, and more particularly to a system for a network system with synchronization.

BACKGROUND ART

As the Internet has become widely used and information services are provided through networks, the communication network occupies an important place in social infrastructure. With the increase in Internet access from homes and business locations of companies, faster and higher-capacity access lines are increasingly required to interconnect these communication sites and communication stations of carrier networks.

In access networks that are connected to a wide area network, there is a passive optical network (PON) in which a plurality of subscriber terminals can share an optical fiber. A passive optical network (PON) system can be installed at user's sites.

The passive optical network (PON) system can be an access network suitable for delivering the same service information to a plurality of user terminals. The passive optical network (PON) system is drawing attentions recently, particularly for the broadcasting industry seeking to enter into the network business for the triple-play service (broadcasting, telephone, and data communications).

Access or transport networks are merging, becoming predominantly packet switched, and synchronization is becoming a very important performance requirement. Particularly for 3G- and 4G long term evolution (LTE) backhaul applications, dense deployment of radio towers represents a high cost Global Positioning System (GPS) frequency standards to radio operators.

The passive optical network (PON) represents a very economical access medium. With the introduction of IEEE802.1AS (Clause 13), there is a new synchronization technique involving special new features. However, such synchronization technique is expensive and risky for upgrades due to high equipment costs, downtime, SW development, etc.

Synchronization for Time of Day (ToD) is becoming a major requirement in some passive optical network (PON) markets since IEEE 1588 over passive optical network (PON) performs poorly. These passive optical network (PON) markets can be related to cellular tower backhaul, femto-cell deployments, Ethernet Passive Optical Network (EPON), and Gigabit Passive Optical Network (GPON).

Thus, a need still remains for a network system with synchronization mechanism. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a network system including a network line terminal coupled to a slave network unit and a master network unit over a first network including: calculating a master round trip time between the network line terminal and the master network unit; sending a master message to the slave network unit, the master message having the master round trip time and a master local time; and calculating a slave local time based on the master round trip time and the master local time.

The present invention provides a method of operation of a network system including a network line terminal coupled to a slave network unit and a master network unit over a first network including: providing a time event; generating a master pulse-per-second output based on the time event; generating a master local time based on the master pulse-per-second output; and generating a master message with the master local time.

The present invention provides a method of operation of a network system including a network line terminal coupled to a slave network unit and a master network unit over a first network including: receiving a slave downstream delay; receiving a master message having a master time of day, a master local time, and a master downstream delay; and calculating a slave local time based on the master message and the slave downstream delay.

The present invention provides a method of operation of a network system including a network line terminal coupled to a slave network unit and a master network unit over a first network, an additional network line terminal coupled to a first additional network unit and a second additional network unit over an additional network, and the slave network unit coupled to the first additional network unit over a second network including: sending a master message from the master network unit to the slave network unit; calculating a slave local time based on the master message with the slave network unit; and receiving the slave local time with the first additional network unit.

The present invention provides a network system including a network line terminal coupled to a slave network unit and a master network unit over a first network, including: a master calculation unit for calculating a master round trip time between the network line terminal and the master network unit; a master interface unit for sending a master message to the slave network unit, the master message having the master round trip time and a master local time; and a slave calculation unit for calculating a slave local time based on the master round trip time and the master local time.

The present invention provides a network system including a network line terminal coupled to a slave network unit and a master network unit over a first network, including: a time source for providing a time event; a master counter for generating a master pulse-per-second output based on the time event; a master snapshot register for generating a master local time based on the master pulse-per-second output; and a master control unit for generating a master message with the master local time.

The present invention provides a network system including a network line terminal coupled to a slave network unit and a master network unit over a first network, including: a slave interface unit for receiving a slave downstream delay; a slave control unit for receiving a master message having a master time of day, a master local time, and a master downstream delay; and a slave calculation unit for calculating a slave local time based on the master message and the slave downstream delay.

The present invention provides a network system including a network line terminal coupled to a slave network unit and a master network unit over a first network, an additional network line terminal coupled to a first additional network unit and a second additional network unit over an additional network, and the slave network unit coupled to the first additional network unit over a second network, including: a master interface unit for sending a master message from the master network unit to the slave network unit; and wherein: the slave network unit is for calculating a slave local time based on the master message with; and the first additional network unit is for receiving the slave local time.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
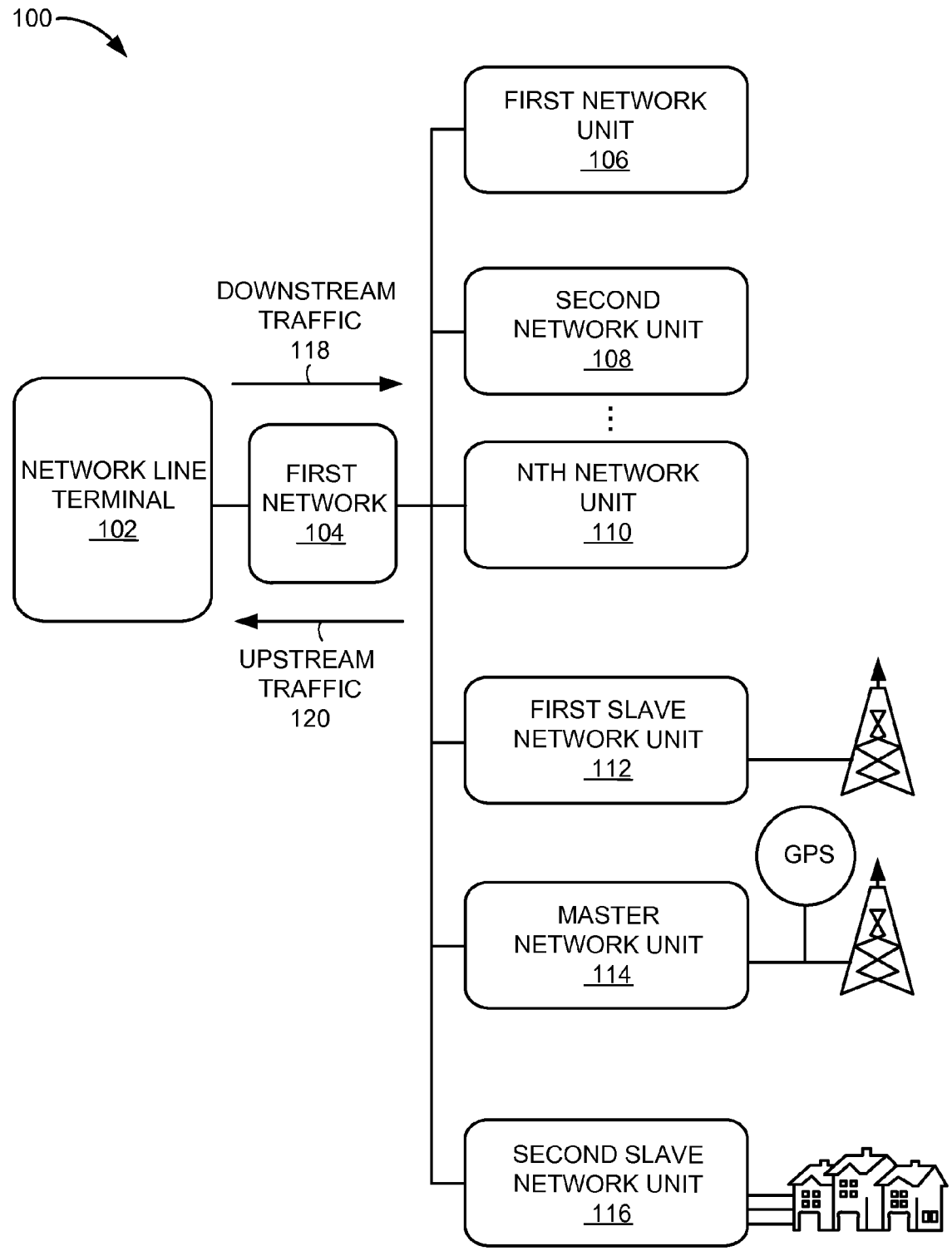
FIG. 1 is a network system with synchronization mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a network system 100 with synchronization mechanism in an embodiment of the present invention. The network system 100 is defined as a system for distributing information to and from devices or terminals on a network. For example, the network system 100 can be a passive optical network (PON).

The network system 100 can include a network line terminal 102, more particularly a network device that connects a high speed network link to multiple devices operating at a lower speed. The network line terminal 102 can be located at a service provider's central office (CO). The network system 100 can include a medium where all network units can be syntonized to the network line terminal 102.

For example, the network line terminal 102 can be an optical line terminal (OLT) or an access node. Also for example, the network line terminal 102 can include equipments, internet service provider (ISP) interfaces to metro-local area network (metro-LAN), as well as network control configurations.

The network line terminal 102 can provide functionalities including transport, multiplexing, switching, management, supervision, or a combination thereof. For example, the network line terminal 102 can include components such as hardware, software, memory, dedicated computational units, or any combination thereof.

The network line terminal 102 can transmit client signals via a first network 104, more specifically a fiber optic cable, an optical connection, a splitter, or a combination thereof. For example, the first network 104 can include passive optical network (PON) optics.

The network line terminal 102 can be connected to the network units, part of which is shown as a first network unit 106, a second network unit 108, and an nth network unit 110, via the first network 104. The network units are more specifically devices or stations that can distribute network information from a higher speed network connection to multiple lower speed network connections. For example, the network units can be optical network units (ONUs), optical network terminals (ONTs), or multi-dwelling units (MDUs).

The network units can include a first slave network unit 112 connected to the network line terminal 102 via the first network 104. The first slave network unit 112 is more specifically a device or a station that distributes network information from a higher speed network connection to multiple lower speed network connections. For example, the first slave network unit 112 can be an optical network unit (ONU) or an optical network terminal (ONT).

The network units can include a master network unit 114 connected to the network line terminal 102 via the first network 104. The master network unit 114 is more specifically a device or a station that not only distributes network information from a higher speed network connection to multiple lower speed network connections but also provides synchronization information, which can then be disseminated to other network units. For example, the master network unit 114 can be an optical network unit (ONU) or an optical network terminal (ONT).

The master network unit 114 can get access to a Global Positioning System (GPS) signal from a radio cell tower. The master network unit 114 can receive a clock source, which can be a Global Positioning System (GPS) frequency source at an antenna site.

The network units can include a second slave network unit 116 connected to the network line terminal 102 via the first network 104. The second slave network unit 116 is more specifically a device or a station that distributes network information from a higher speed network connection to multiple lower speed network connections. For example, the second slave network unit 116 can be an optical network unit (ONU) or an optical network terminal (ONT).

The first slave network unit 112 and the second slave network unit 116 can receive the synchronization information from the master network unit 114. For example, the second slave network unit 116 can be a multi-dwelling unit (MDU) that is connected to a cluster of buildings or offices.

The first slave network unit 112 and the second slave network unit 116 can communicate with the master network unit 114. The first slave network unit 112 and the second slave network unit 116 can have spatially distributed clocks that can be synchronized to a clock of the master network unit 114.

The network system 100 can function as a hub-and-spoke network. In other words, the network line terminal 102 can be at a center of a network hub and the network units can be at ends of spokes that are connected to the network hub.

The network units can be located downstream from the network line terminal 102. The "nth" designation in the nth network unit 110 symbolizes that there can be any number of the network units that are downstream from the network line terminal 102.

The network units can have the same or different transfer characteristics with each other. For example, the first network unit 106, the second network unit 108, the nth network unit 110, or a combination thereof can provide the same or different functions.

The network line terminal 102 can send a downstream traffic 118, more particularly network information being from the network line terminal 102 to one or more of the network units. The downstream traffic 118 can include data, traffic management control, video, text, images, or any combination thereof. The network units can be registered and coupled to the network line terminal 102.

The network units can send an upstream traffic 120 to the network line terminal 102. The upstream traffic 120 is defined as network information transmitted from the network units to the network line terminal 102. The upstream traffic 120 can include a grant request, data, control information, status reports, video, text, images, or any combination thereof.

For illustrative purposes, the network system 100 is described with the network line terminal 102 as a single device, although it is understood that the network line terminal 102 can have different configurations. For example, the network line terminal 102 can be a single device or multiple devices with a partitioning of functionality between the multiple devices.

The first network 104 can include a variety of network types. For example, the first network 104 can include optical fiber channels, multi-spectral optical channels, electrical channels, wireless communications, wired communication, or any combination thereof.

For illustrative purposes, the network system 100 is described with the network units shown as single devices, although it is understood that the network units can have different configurations. For example, each of the network units can be a single device or multiple devices with a partitioning of functionality between the multiple devices.

Also, for illustrative purposes, the network system 100 is shown having the network units including the first network unit 106 to the nth network unit 110, the master network unit 114, the first slave network unit 112, and the second slave network unit 116 as separate network units, although the network units can be partitioned differently. For example, the master network unit 114 and the first slave network unit 112 can be within a single network unit having both master and slave functions.

Figure 2:
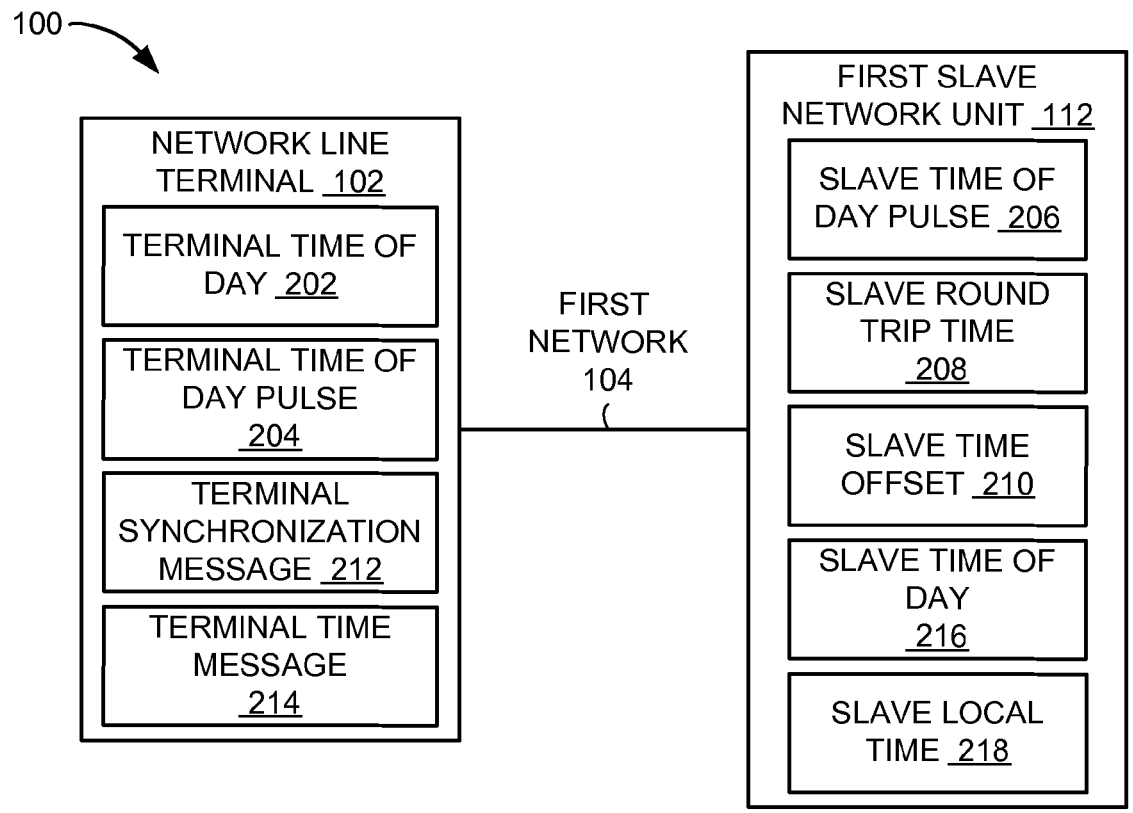
FIG. 2 is a block diagram of a portion of the network system between the network line terminal and the first slave network unit.

Referring now to FIG. 2, therein is shown a block diagram of a portion of the network system 100 between the network line terminal 102 and the first slave network unit 112. The portion of the network system 100 includes a portion of the network line terminal 102 interfacing with a portion of the first slave network unit 112.

For illustrative purposes, the portion of the network system 100 includes the first slave network unit 112, although any of the network units can be included. For example, the portion of the network system 100 can include the first network unit 106 of FIG. 1, the second network unit 108 of FIG. 1, the nth network unit 110 of FIG. 1, the first slave network unit 112, the master network unit 114 of FIG. 1, the second slave network unit 116 of FIG. 1, or a combination thereof.

The network system 100 can perform the synchronization mechanism with a pulse-per-second (PPS) synchronization process. The pulse-per-second (PPS) synchronization process is defined as a method that transfers a terminal time of day 202, more specifically time information or a reference to the time of the day (ToD) at the network line terminal 102, from the network line terminal 102 to the first slave network unit 112. The terminal time of day 202, designated as NLT_ToD, can have an accuracy of approximately 20 nanoseconds (ns) from the time of the day (ToD).

The pulse-per-second (PPS) synchronization process can compensate for latency across the first network 104. The latency across the first network 104 can include a time delay between the network line terminal 102 and the first slave network unit 112.

A terminal time of day pulse 204 can be generated at the network line terminal 102. The terminal time of day pulse 204 is specifically a strobe or an event that can be generated by hardware or logic to indicate when the terminal time of day 202 is updated.

The pulse-per-second (PPS) synchronization process can generate a slave time of day pulse 206 generated at the first slave network unit 112 when the terminal time of day pulse 204 occurs at the network line terminal 102. The slave time of day pulse 206 is specifically a strobe or an event that can be generated by hardware or logic to indicate when a time of day (ToD) at the first slave network unit 112 is updated.

Following an active edge of the terminal time of day pulse 204, the network line terminal 102 sends the terminal time of day 202 to the first slave network unit 112. For example, the terminal time of day 202 can include an American Standard Code for Information Interchange (ASCII) character string.

The network system 100 can utilize a time multiplexed upstream multiple access protocol. In other words, the first slave network unit 112 can be required to carefully time any upstream emission from its transmit (Tx) laser to prevent corruption of another of the network units' transmission.

The network system 100 can include discretely timed upstream transmissions from the network units to the network line terminal 102. The discretely timed upstream transmissions can require a timing alignment between the network units.

The timing alignment can be controlled by a ranging process, more specifically an operation that is used to determine and maintain round trip times of all of the network units that are registered with the network line terminal 102. The round trip times of the network units can be used to determine downstream delays of the network units. The ranging process can be a continual process, which can be necessary due to temperature or aging delay drifts.

For example, the ranging process can be performed by the network line terminal 102. Also for example, the ranging process can be performed with a Precision Time Protocol (PTP) or a synchronization protocol by sending synchronization messages and capturing timestamps, more particularly recorded times of events, when the synchronization messages are sent and received at the network line terminal 102 and the network units.

Each time the synchronization messages are sent from or received at either the network line terminal 102 or one of the network units, the timestamps can be recorded for purposes of calculating the downstream delay and the upstream delay.

To time any upstream transmissions during a transmit time (or window), the network line terminal 102 and the first slave network unit 112 can perform the ranging process in order to determine a slave round trip time 208 between the network line terminal 102 and the first slave network unit 112. The slave round trip time 208 is more specifically a sum of delays of downstream and upstream paths between the network line terminal 102 and the first slave network unit 112.

For example, the ranging process can be performed by Media Access Control (MAC) sub-layers of the network line terminal 102 and the first slave network unit 112. A Media Access Control (MAC) sub-layer is defined as one of the layers of a Data Link Layer (not shown) that interfaces to another layer of the Data Link Layer and a physical layer (not shown) connected to the first network 104.

Also for example, the slave round trip time 208 can be used to determine when a transmission from the first slave network unit 112 reaches an optical receiver of the network line terminal 102. Further, for example, the slave round trip time 208 can be used to determine when a transmission from the network line terminal 102 reaches an optical receiver of the first slave network unit 112.

As an example, the first network 104 can include separate optical wavelengths for downstream and upstream transmissions in a common strand of an optical fiber. Given these optical wavelengths and index of refraction properties of the optical fiber, an effective reach can be calculated. The effective reach is defined as a physical distance along the first network 104 between the network line terminal 102 and the first slave network unit 112.

As another example, other processing delays, such as intrinsic or logic delays of downstream logic in the network line terminal 102 and the first slave network unit 112, can be determined and taken into account when calculating the effective reach. With the effective reach calculated, a difference in terms of time of day between the network line terminal 102 and the first slave network unit 112 can be determined.

The slave round trip time 208 and that of the master network unit 114 between the network line terminal 102 and the first slave network unit 112 and the master network unit 114, respectively, will be discussed later in more details. With the ranging process, a slave time offset 210, designated as dT and more specifically a time difference between the network line terminal 102 and the first slave network unit 112, can be calculated. The network line terminal 102 can send a terminal synchronization message 212, more specifically a message containing information for purposes of locking or syntonizing clocks between a master and a slave in the network system 100.

The network line terminal 102 can send the terminal synchronization message 212 to the first slave network unit 112 at time T. The terminal synchronization message 212 can arrive at the first slave network unit 112, after the slave time offset 210 has elapsed, at time T+dT. As such, the slave round trip time 208, which is partially based on the slave time offset 210, can be determined.

The network line terminal 102 can send a terminal time message 214, more specifically a message including a value of the terminal time of day 202 and a terminal Media Access Control (MAC) time, such as a value of a Media Access Control (MAC) timebase or a number of Media Access Control (MAC) timebase ticks at the network line terminal 102.

A tick at the network line terminal 102 is defined as a unit of time or a clock cycle of a local or reference clock at the network line terminal 102. The local or reference clock at the network line terminal 102 can be used by the network line terminal 102 to calculate a time of day or a local time at the network line terminal 102. The terminal time message 214 can be local to the network line terminal 102.

For example, the terminal time message 214 can be a time of day (ToD) message or a pulse-per-second (PPS) message. The terminal time message 214 can be sent to all of the network units including the first slave network unit 112.

In addition, with the slave round trip time 208, the first slave network unit 112 can compute the slave time offset 210. The first slave network unit 112 can calculate a slave time of day 216, more specifically a time of day at the first slave network unit 112, based on the terminal time of day 202 (NLT_ToD) and the slave time offset 210 (dT).

The slave time of day 216 can be calculated with an addition of the terminal time of day 202 and the slave time offset 210. In other words, the slave time of day 216 can be calculated as NLT_ToD+dT.

For illustrative purposes, the first slave network unit 112 is shown to include the slave round trip time 208, although the slave round trip time 208 can be generated by the network line terminal 102, saved in the network line terminal 102, and sent to the first slave network unit 112.

The first slave network unit 112 can determine a slave local time 218, more particularly a time in ticks at the first slave network unit 112. A tick at the first slave network unit 112 is defined as a unit of time or a clock cycle of a local or reference clock at the first slave network unit 112.

The local or reference clock at the first slave network unit 112 can be used by the first slave network unit 112 to calculate a time of day or a local time at the first slave network unit 112. The local or reference clock at the first slave network unit 112 can be based on a serial clock, a recovered clock derived from a serial input signal received from the first network 104, or a local peripheral clock at the first slave network unit 112.

For example, the slave local time 218 can be a slave Media Access Control (MAC) time. When the terminal time of day 202 is at time T, the slave time of day 216 is at NLT_ToD+dT. As such, the slave local time 218 can be linked to or associated with the terminal time of day 202 of the network line terminal 102.

Figure 3:
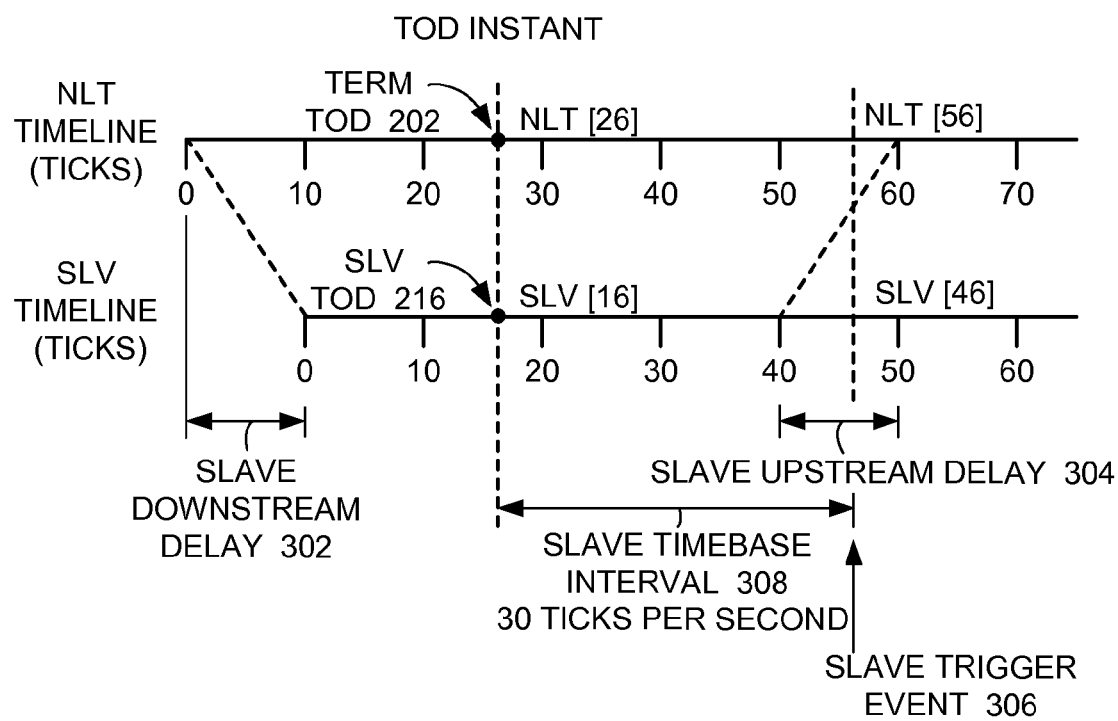
FIG. 3 is an example of a timing diagram between the network line terminal of FIG. 1 and the first slave network unit of FIG. 1.

Referring now to FIG. 3, therein is shown an example of a timing diagram between the network line terminal 102 of FIG. 1 and the first slave network unit 112 of FIG. 1. In order to provide approximately the same time of day (ToD) at each of the network units, a calculation of downstream fiber and processing delay components can be performed for each of the network units.

The slave round trip time 208 of FIG. 2 can be determined based on a slave downstream delay 302 and a slave upstream delay 304. The slave downstream delay 302 is more specifically a time delay from the network line terminal 102 of FIG. 1 to the first slave network unit 112. The slave upstream delay 304 is more specifically a time delay from the first slave network unit 112 to the network line terminal 102.

By the time the terminal time of day 202 is received by the first slave network unit 112, the actual time has passed the terminal time of day 202. With the slave round trip time 208, the slave time offset 210 of FIG. 2 between the network line terminal 102 and the first slave network unit 112 can be calculated and used to predict the next value of the slave time of day 216 at the first slave network unit 112. In other words, a time delay from the network line terminal 102 to the first slave network unit 112 can be used to offset a time of day (ToD) at the network line terminal 102 to a predicted time of day (ToD) instant at the first slave network unit 112.

The term "instant" is defined as a specific value of the network (e.g. PON MAC) timebase that can be tracked at each of the network units. The first slave network unit 112 can generate a slave trigger event 306, more specifically a strobe or a trigger that is generated every second, as an example, when the network timebase is received by the first slave network unit 112. For example, the network timebase can be sent by the network line terminal 102 or the master network unit 114 of FIG. 1.

The slave trigger event 306 can be used to align a free-running local timer that generates local pulse-per-second (PPS) signals at the first slave network unit 112. For example, the slave trigger event 306 can be a local Media Access Control (MAC) trigger or a one-pulse-per-second (1 PPS) trigger event.

The first slave network unit 112 can include a slave timebase interval 308, more specifically a duration that represents a number of ticks per second at the first slave network unit 112. The slave timebase interval 308 can be used to determine when the next time of day (ToD) event can occur after the current time of day (ToD) event.

The slave timebase interval 308 can be predetermined and configured based on a number of ticks per second. A tick is defined as a unit of time or a cycle of a clock.

The slave round trip time 208 can be calculated as a sum of the slave downstream delay 302 and the slave upstream delay 304. For example, the slave downstream delay 302 and the slave upstream delay 304 are shown as 10 ticks, resulting in the slave round trip time 208 of 20 ticks.

When the time of day (ToD) at the network line terminal 102 is at time 26 ticks, designated as NTL[26], the time at the first slave network unit 112 is at 16 ticks, designated as SLV[16]. As an example, there are 30 ticks per second at both the network line terminal 102 and the first slave network unit 112. The next time of day (ToD) second at the network line terminal 102 can occur at 56 ticks, designated as NLT[56].

By configuring the first slave network unit 112 to trigger at 46 ticks, designated as SLV[46], the slave time of day pulse 206 of FIG. 2 can occur simultaneously or near simultaneously within a tick granularity with a time of day (ToD) reference, such as a time of day (ToD) master reference. In other words, the slave time of day pulse 206 at SLV[46] can occur simultaneously or near simultaneously within a tick granularity with the terminal time of day pulse 204 of FIG. 2 as the time of day (ToD) reference at NLT[56].

Neither an interface or serial bit clock (between the network line terminal 102 and the first slave network unit 112 or a clock of a local pulse-per-second (PPS) timer at the first slave network unit 112 is not guaranteed to be frequency locked to the time of day (ToD) standard or reference. The network line terminal 102 and the first slave network unit 112 can include functions to perform an algorithm that estimates a timing error, a timing drift, or a combination thereof of the interface clock and the clock of the local pulse-per-second (PPS) timer relative to the time of day (ToD) reference, as discuss later.

Figure 4:
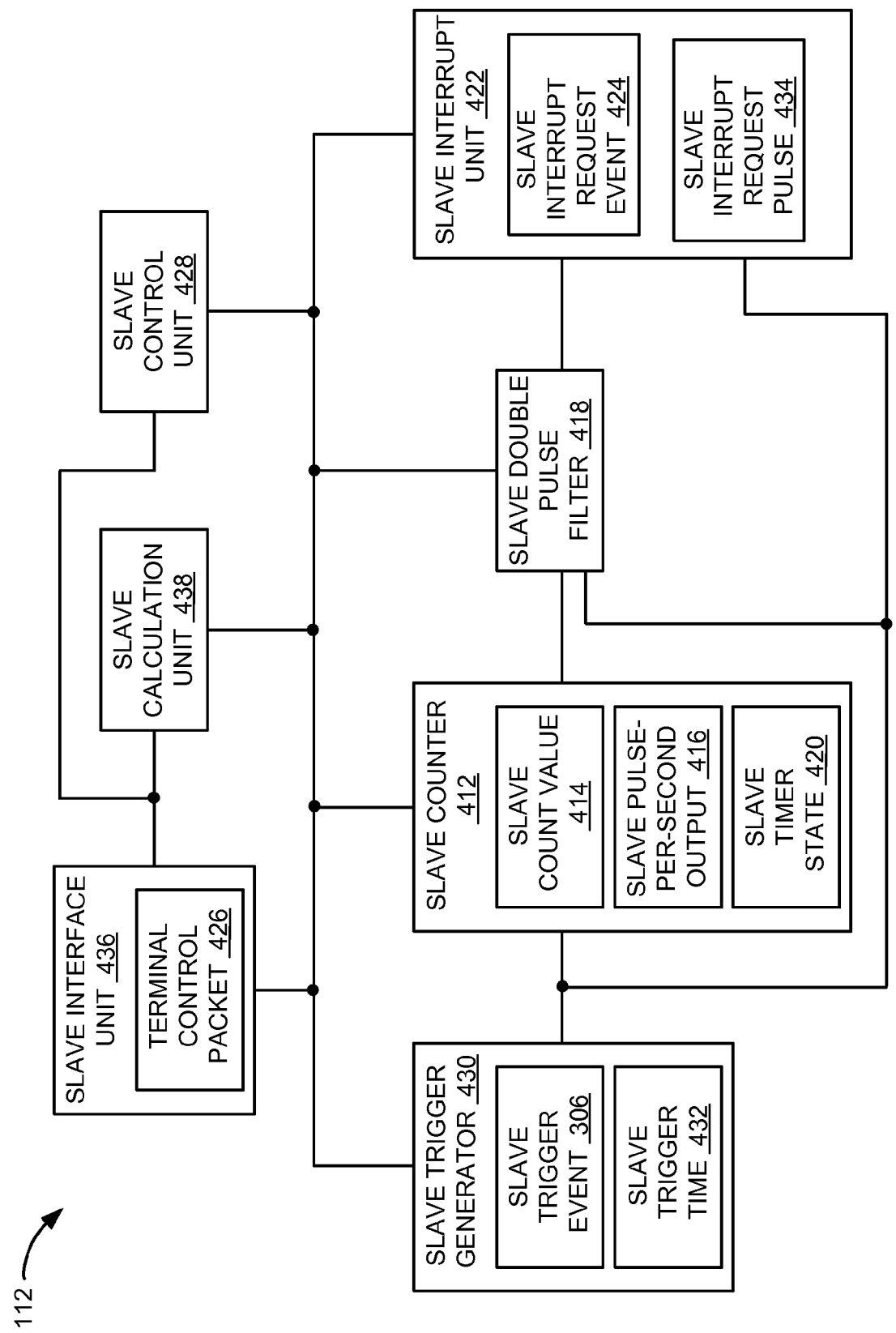
FIG. 4 is a block diagram of a portion of the first slave network unit.

Referring now to FIG. 4, therein is shown a block diagram of a portion of the first slave network unit 112. The first slave network unit 112 can include a slave counter 412, more specifically a hardware unit that functions as a timer.

The slave counter 412 can generate a free-running pulse-per-second (PPS) pulse train. For example, the slave counter 412 can be the free-running local timer, a local hardware counter, or a local one-pulse-per-second (1 PPS) timer.

The slave counter 412 can have a precision of approximately less than 10 nanoseconds (ns) and a dynamic range of approximately one second (sec) based the local clock operating the slave counter 412. The slave counter 412 can be used to implement a pulse-per-second (PPS) timer with a suitable tracking resolution. For example, the slave counter 412 can have a resolution that is based on a synchronization application and is no more than approximately ¼ of a system timing jitter budget.

The slave counter 412 can have the dynamic range that is wide enough to handle a pulse-per-second (PPS) event plus a specified network frequency accuracy. For example, the specified network frequency accuracy can be approximately 50 parts per million (ppm).

The slave counter 412 can keep track of a slave count value 414, more specifically a timer value. For example, the slave count value 414 can be decremented.

The slave counter 412 can generate a slave pulse-per-second output 416, more specifically a strobe or an event that occurs once in a timer duration that can be configured to 1 second. In other words, when the timer duration is reached, the slave counter 412 can decrement to zero and can generate the slave pulse-per-second output 416, and the slave counter 412 can automatically be reset or restarted.

The slave counter 412 can be restarted by reloading the slave counter 412 with the timer duration and then decrement. The slave counter 412 can be operated at a local timer frequency.

The slave counter 412 can detect when the slave trigger event 306 occurs. If the slave trigger event 306 occurs before the slave counter 412 reaches zero, the slave counter 412 can terminate, generate the slave pulse-per-second output 416, and restart. When the slave counter 412 restarts, the slave counter 412 can be loaded with a new number of the timer duration to decrement from so that the new timer duration better match a 1-second duration.

If the slave trigger event 306 occurs just after the slave counter 412 is automatically restarted, the slave counter 412 can be restarted. For such case, a slave double pulse filter 418, more specifically a hardware unit that generates an output that does not have two pulses that occur within a predetermined duration, can be implemented.

The slave double pulse filter 418 can receive the slave pulse-per-second output 416 and the slave trigger event 306 to generate a pulse output. The slave double pulse filter 418 can be coupled to the slave counter 412.

The slave double pulse filter 418 can use a blanking window for a double pulse filtering process to generate the pulse output. The blanking window is defined as a predetermined time duration in which a pulse is not output or prevented from being output. The blanking window can be sufficient to accommodate a local frequency error. For example, the local frequency error can be approximately 20 parts per million (ppm).

The slave counter 412 can generate a slave timer state 420, more specifically a state of the slave counter 412 based on the slave trigger event 306. The slave timer state 420 can be recorded to indicate if the slave counter 412 reaches the timer duration earlier or later than the slave trigger event 306.

As such, the slave timer state 420 can be used to estimate a frequency offset of the local reference clock of the slave counter 412 and a time of day (ToD) reference clock. As an example, the frequency offset can indicate a difference between the terminal time of day 202 of FIG. 2 at the network line terminal 102 of FIG. 1 and the slave time of day 216 of FIG. 2 at the first slave network unit 112 of FIG. 1, which are shown in FIG. 3.

For example, the local reference clock of the slave counter 412 can be a recovered clock derived from a signal received via the first network 104 of FIG. 1. Also for example, the time of day (ToD) reference clock can be a clock at the network line terminal 102, with which the terminal time of day 202 can be generated at the network line terminal 102, or a clock provided by Global Positioning System (GPS) at the master network unit 114 of FIG. 1.

A slave interrupt unit 422, more specifically a hardware unit that generates a request for service, can receive the pulse output from the slave double pulse filter 418 and generate a slave interrupt request event 424, more specifically a command to indicate that a one-pulse-per-second (1 PPS) local pulse is generated. The slave interrupt unit 422 can be coupled to the slave double pulse filter 418.

The slave interrupt request event 424 can allow software (SW) to maintain the slave local time 218 of FIG. 2. For example, the software can generate and hold a fractional portion of the slave local time 218. The slave interrupt request event 424 can trigger a time of day (ToD) American Standard Code for Information Interchange (ASCII) string transmission with a universal asynchronous receiver/transmitter (UART) interface.

The first slave network unit 112 can receive a terminal control packet 426, more specifically a Media Access Control (MAC) control layer packet or a protocol layer packet, from the network line terminal 102 of FIG. 1. The terminal control packet 426 can be received by a slave control unit 428, more specifically a computing hardware unit that executes functions of the first slave network unit 112.

The terminal control packet 426 can include time of day (ToD) control information. For example, the terminal control packet 426 can be received by the slave control unit 428 and processed by software. Also for example, the terminal control packet 426 can be a pulse-per-second (PPS) Media Access Control (MAC) control packet.

A slave trigger generator 430, more specifically a hardware unit that functions as a timer, can generate the slave trigger event 306 by keeping track of or counting a local timebase (e.g. a PON MAC local timebase). The slave trigger event 306 can be generated based on a slave trigger time 432, more specifically a time at which a trigger event is asserted at the first slave network unit 112.

When the local timebase reaches the slave trigger time 432, the slave trigger event 306 is asserted or active. For example, the slave trigger time 432 can be configured by software. Also for example, the slave trigger time 432 can be a local Media Access Control (MAC) timebase trigger value.

The slave interrupt unit 422 can receive the slave trigger event 306. When the slave trigger event 306 is asserted, the slave interrupt unit 422 can generate a slave interrupt request pulse 434, more specifically a command to indicate that a one-pulse-per-second (1 PPS) local event is active. The slave interrupt request pulse 434 can be used to detect a missed trigger event and indicate an out of lock condition.

The first slave network unit 112 can include a slave interface unit 436, more specifically a hardware unit that transmits and receives information to and from the first slave network unit 112. For example, the slave interface unit 436 can enable external communication to and from the first slave network unit 112 to communicate with the network line terminal 102, the master network unit 114 of FIG. 1, any other network units, the first network 104 of FIG. 1, and an attachment, such as a peripheral device or a computer desktop. Also for example, the slave interface unit 436 can receive the terminal control packet 426 and send it to the slave control unit 428 to process. Further, for example, the slave interface unit 436 can receive the slave round trip time 208 of FIG. 2 from the network line terminal 102 of FIG. 1.

The first slave network unit 112 can include a slave calculation unit 438, more specifically a hardware unit that computes delays or times for the first slave network unit 112 for purposes of time of day (ToD) synchronization. For example, the slave calculation unit 438 can calculate the slave time of day 216 of FIG. 2 or the slave local time 218 of FIG. 2 based on the pulse output from the slave double pulse filter 418. Also for example, the slave calculation unit 438 can calculate an integer portion of the slave local time 218 based on the slave pulse-per-second output 416 and the software can calculate a fractional portion of the slave local time 218.

For illustrative purposes, the first slave network unit 112 is shown with hardware units, although the first slave network unit 112 can be implemented differently. For example, the hardware units shown are the slave counter 412, the slave double pulse filter 418, the slave interrupt unit 422, the slave control unit 428, the slave trigger generator 430, the slave interface unit 436, and the slave calculation unit 438.

As an example, the slave counter 412 can be implemented differently by using the slave control unit 428, such as a processor, an embedded processor, a microprocessor, a hardware control logic, a hardware finite state machine (FSM), a digital signal processor (DSP), or a combination thereof. As another example, the slave control unit 428 can execute a software to provide intelligence for the first slave network unit 112.

Figure 5:
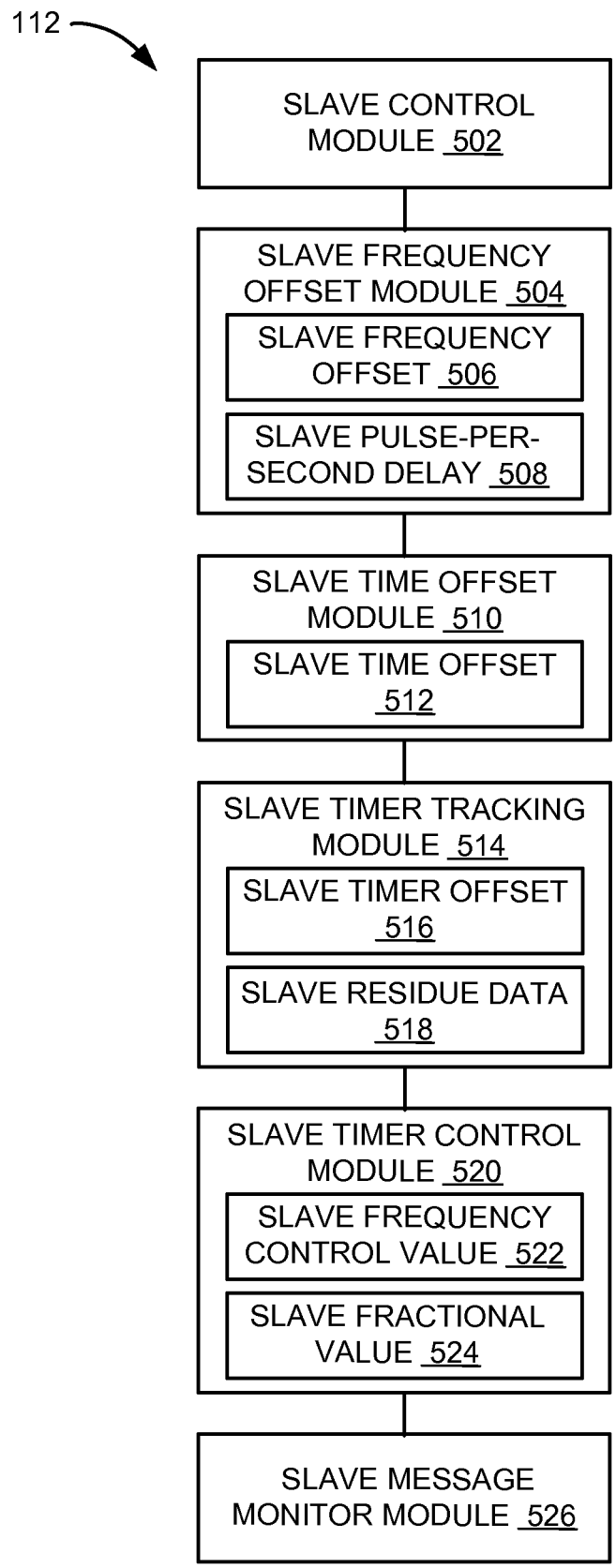
FIG. 5 is a flow chart of a portion of the first slave network unit.

Referring now to FIG. 5, therein is shown a flow chart of a portion of the first slave network unit 112. The first slave network unit 112 can include a slave control module 502 to control the slave control unit 428 of FIG. 4. For example, the slave control module 502 can configure the slave control unit 428 to calculate the slave local time 218 of FIG. 2.

The slave control module 502 can configure the slave control unit 428 to configure a hardware forwarding path to trap the terminal control packet 426 of FIG. 4. The slave control module 502 can receive the terminal control packet 426 from the slave control unit 428 and process the terminal control packet 426.

The first slave network unit 112 can include a slave frequency offset module 504 to estimate a slave frequency offset 506, more particularly a frequency difference or shift between the time of day (ToD) reference clock and a recovered clock. The recovered clock is more specifically a passive optical network (PON) serial clock frequency or a clock that is recovered from a downstream signal from the network line terminal 102 of FIG. 1 or the master network unit 114 of FIG. 1 to the first slave network unit 112.

For example, the slave frequency offset 506 can be a local pulse-per-second (PPS) frequency offset. The slave frequency offset module 504 can be coupled to the slave control module 502.

The slave frequency offset 506 can be estimated by examining the slave time of day 216 of FIG. 2 and the slave trigger time 432 of FIG. 4, which can be included in the terminal control packet 426 received from the network line terminal 102. The slave frequency offset 506 can be estimated by comparing a difference in time of day (ToD) (seconds) between occurrences of the terminal synchronization message 212 of FIG. 2 and a number of Media Access Control (MAC) timebase ticks between specified occurrences of the slave trigger event 306 of FIG. 3.

The slave frequency offset module 504 can record a slave pulse-per-second delay 508, more specifically a Media Access Control (MAC) pulse-per-second (PPS) time. The slave pulse-per-second delay 508 can include a fractional resolution of Media Access Control (MAC) timebase ticks. The slave pulse-per-second delay 508 can be used to predict a Media Access Control (MAC) timebase value at any arbitrary time of day (ToD).

The first slave network unit 112 can include a slave time offset module 510 to estimate a slave time offset 512, more specifically a measurement of changes in the slave round trip time 208 of FIG. 2. The slave time offset module 510 can be coupled to the slave frequency offset module 504.

The slave time offset module 510 can differentiate or filter the changes in the slave round trip time 208 from changes in a relative clock frequency. In other words, as the slave round trip time 208 changes, there can be an increase or a decrease in a number of Media Access Control (MAC) timebase ticks between time of day (ToD) messages. The slave time offset 512 cannot be used in the slave frequency offset module 504 as the slave time offset 512 is not due to a frequency movement but due to a time offset movement.

The first slave network unit 112 can include a slave timer tracking module 514 to track a slave timer offset 516, more specifically an offset of the local timer frequency. The local timer frequency is a clock rate at which the slave counter 412 of FIG. 4 operates.

The local timer frequency can also be the same frequency of a local clock that used to operate the first slave network unit 112. The slave timer tracking module 514 can be coupled to the slave time offset module 510.

The slave timer offset 516 can be determined by collecting slave residue data 518, more specifically a value of the slave counter 412 that is sampled based on the slave interrupt request pulse 434 of FIG. 4 whenever the slave trigger event 306 occurs. The slave residue data 518 can indicate a magnitude and a sign of the slave frequency offset 506.

The first slave network unit 112 can include a slave timer control module 520 to generate a slave frequency control value 522, more specifically a timer value that is used to configure the slave counter 412 to generate the slave pulse-per-second output 416 of FIG. 4 having a repetition period. For example, the slave frequency control value 522 can be a software local pulse-per-second (PPS) timer frequency control word (FCW) or the timer duration.

The slave frequency control value 522 can optionally include a slave fractional value 524, more specifically a tick resolution. With the slave fractional value 524, the slave frequency control value 522 can be provided so that the slave counter 412 can be properly controlled.

The slave counter 412 can be properly controlled with the slave frequency control value 522 having the slave fractional value 524 by the slave timer control module 520 employing a dithering mechanism to minimize a drift and jitter characteristic of the slave pulse-per-second output 416 of the slave counter 412. The dithering mechanism is a method of varying the slave frequency control value 522 by changing the slave fractional value 524 by a predetermined value. The slave frequency control value 522 can be updated after several seconds have elapsed since the last update.

The first slave network unit 112 can include a slave message monitor module 526 to detect the terminal synchronization message 212 from the network line terminal 102. Particularly, if there is a plurality of the network line terminal 102, the slave message monitor module 526 can detect the terminal synchronization message 212 of each of the plurality of the network line terminal 102. For example, if there are two active Gigabit Passive Optical Network (GPON) Media Access Control (MAC) sub-layers of two network line terminals, the slave message monitor module 526 can detect pulse-per-second (PPS) messages from both of the two network line terminals.

The slave message monitor module 526 can detect the terminal synchronization message 212 from each of the plurality of the network line terminal 102 to ensure that time of day (ToD) information from the plurality of the network line terminal 102 are consistent. When an automatic protection switching (APS) event occurs, such consistency can simplify a reference switch over since a known estimate of a protection Media Access Control (MAC) pulse-per-second (PPS) trigger has already been calculated.

In any type of switch-over event, service can continue without interruption. In this case, slave network units can track and determine frequency offsets of both synchronization masters. The frequency offset information can be used to determine a prediction interval for the next Media Access Control (MAC) time of day (ToD) event.

Prediction interval values can be averaged over long periods for purposes of achieving accuracy. Averaged prediction interval values can be used to compute fractional offset coefficients that are needed in the computation of the next predicted time of day (ToD) event.

For illustrative purposes, the first slave network unit 112 is shown to include the slave message monitor module 526 to detect the terminal synchronization message 212, although the first slave network unit 112 can detect messages from the master network unit 114. For example, the messages from the master network unit 114 can include time messages from the master network unit 114 to other network units, including the first slave network unit 112.

The flow chart is described with the module functions or order as an example. The modules can be partitioned differently. For example, the slave frequency offset module 504 and the slave timer tracking module 514 are shown as separate modules, although the slave frequency offset module 504 and the slave timer tracking module 514 can be implemented in a single module. Also for example, the slave frequency offset module 504 is shown before the slave time offset module 510, although the slave frequency offset module 504 can be executed after the slave time offset module 510.

Each of the modules can operate individually and independently of the other modules. For example, the slave control module 502 can be executed during an initialization of the first slave network unit 112. Also for example, the slave timer tracking module 514 can be executed based on an interrupt driven mechanism. In other words, the slave timer tracking module 514 is executed when the slave timer tracking module 514 receives the slave interrupt request pulse 434 of FIG. 4.

The modules can be implemented with the hardware units of the first slave network unit 112 and the software executed by the slave control unit 428. For example, the modules can be implemented by the slave counter 412, the slave double pulse filter 418 of FIG. 4, the slave interrupt unit 422 of FIG. 4, the slave control unit 428, the slave trigger generator 430 of FIG. 4, the slave interface unit 436 of FIG. 4, the slave calculation unit 438 of FIG. 4, the software, or a combination thereof.

Figure 6:
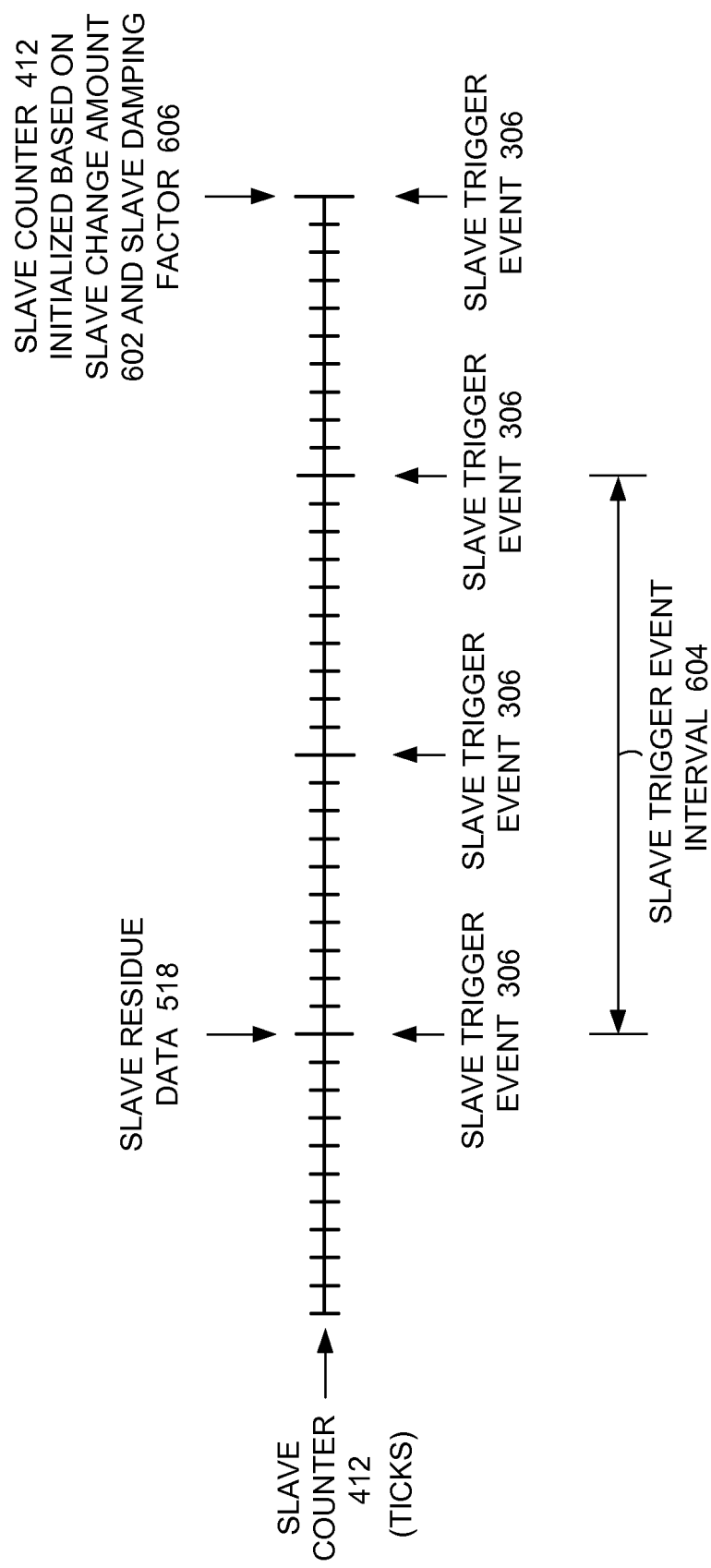
FIG. 6 is a timing diagram of the first slave network unit of FIG. 1 in a frequency adjustment process.

Referring now to FIG. 6, therein is shown a timing diagram of the first slave network unit 112 of FIG. 1 in a frequency adjustment process. When the slave trigger event 306 occurs, the first slave network unit 112 can capture and save the slave residue data 518 of FIG. 5 of the slave counter 412.

The slave trigger event 306 can represent a true one-second event. Depending on the value obtained, the first slave network unit 112 can determine if the local timer frequency is running slower or faster than a pre-determined nominal rate, which is a rate at which there is no frequency offset between the local reference clock of the slave counter 412 of FIG. 4 and the time of day (ToD) reference clock. The local timer frequency can be determined to be slower or faster than the pre-determined nominal rate based on the slave timer state 420 of FIG. 4.

The slave counter 412 can be initialized by loading the slave counter 412 with the slave frequency control value 522 of FIG. 5 and then decrement. When the local timer frequency is equal to the pre-determined nominal rate, the slave count value 414 of FIG. 4 reaches a value of zero when the slave trigger event 306 occurs. The slave timer control module 520 of FIG. 5 can update the slave frequency control value 522 based on the slave interrupt request pulse 434 of FIG. 4 generated when the slave trigger event 306 occurs.

When the local timer frequency is slower than the pre-determined nominal rate and the slave counter 412 is loaded with a pre-determined nominal value of the slave frequency control value 522, the slave count value 414 has not reached zero when a true one-second event occurs. As such, the first slave network unit 112 can reduce the slave frequency control value 522 by a slave change amount 602, more specifically an appropriate amount used to adjust the slave frequency control value 522 in order for the slave counter 412 to generate the slave pulse-per-second output 416 of FIG. 4 having a correct pulse-per-second (PPS) pulse period.

The slave change amount 602 can be calculated based on the slave residue data 518 and a slave trigger event interval 604, more specifically a duration between pre-determined occurrences of the slave trigger event 306. For illustrative purposes, the slave trigger event interval 604 is shown as a duration between two pre-determined occurrences of the slave trigger event 306 that are 2 seconds apart. For example, the slave residue data 518 of the slave counter 412 has a value of 2 (ticks) when the slave trigger event 306 occurs.

In this slower case, the slave residue data 518 can be a small integer, which can be close to zero. If the slave trigger event interval 604 between the pre-determined occurrences of the slave trigger event 306 is N seconds, then the slave change amount 602 can be calculated with a product of a negative one and the slave residue data 518 divided by N, where N is the slave trigger event interval 604. The slave change amount 602 can be calculated with Equation 1 below:

$$\text{slave\_change\_amount} = -\text{slave\_residue\_data}/N \quad (1)$$

To prevent jitter, the slave change amount 602 can be averaged based on values of the slave residue data 518 captured in a number of times during the slave trigger event interval 604. An average value of the captured values of the slave residue data 518, designated as AVG (slave change amount), can be calculated before the average value is applied to a tracking loop.

To limit amounts of overshoot and hunting, a slave damping factor 606 can be applied. A reasonable value of the slave damping factor 606 can preferably be 0.5. For illustrative purposes, let a current value of the slave frequency control value 522 be designated as FCV(n).

The next value of the slave frequency control value 522 can be calculated with an addition of the current value of the slave frequency control value 522 and a product of the slave damping factor 606 and the average value of the captured values of the slave residue data 518. The next value of the slave frequency control value 522, designated as FCV(n+1), can be calculated and updated with Equation 2 below:

$$FCV(n+1)=FCV(n)+\text{slave\_damping\_factor}*\text{AVG}(\text{slave\_change\_amount}) \quad (2)$$

When the local timer frequency is faster than the pre-determined nominal rate and the slave counter 412 is loaded with the pre-determined nominal value of the slave frequency control value 522, the slave counter 412 has reached zero before the true one-second event occurs and begins to count down from the slave frequency control value 522 again. As such, the first slave network unit 112 can increase the slave frequency control value 522 by a different value for the slave change amount 602.

The slave change amount 602 can be calculated based on the slave residue data 518 and the slave trigger event interval 604. For illustrative purposes, the slave trigger event interval 604 is shown as a duration between two pre-determined occurences of the slave trigger event 306 that are 2 seconds apart. For example, the slave residue data 518 of the slave counter 412 has a value of 8 (ticks) when the slave trigger event 306 occurs.

In this faster case, the slave residue data 518 can be a large integer, which can be close to the slave frequency control value 522. If the slave trigger event interval 604 between the pre-determined occurences of the slave trigger event 306 is N seconds, then the slave change amount 602 can be calculated with a difference of the slave residue data 518 and the slave frequency control value 522, a product of a negative one and the difference, and the product divided by N, where N is the slave trigger event interval 604. The slave change amount 602 can be calculated with Equation 3 below:

$$\text{slave\_change\_amount} = -(\text{slave\_residue\_data} - \text{slave\_frequency\_control\_value})/N \quad (3)$$

To prevent jitter, the slave change amount 602 can be averaged based on values of the slave residue data 518 captured in a number of times during the slave trigger event interval 604. An average value of the captured values of the slave residue data 518, designated as AVG(slave change amount), can be calculated before the average value is applied to a tracking loop.

To limit amounts of overshoot and hunting, the slave damping factor 606 can be applied. A reasonable value of the slave damping factor 606 can preferably be 0.5. For illustrative purposes, let a current value of the slave frequency control value 522 be designated as FCV(n). The next value of the slave frequency control value 522, designated as FCV(n+1), can be calculated and updated with Equation 4 below:

$$FCV(n+1) = FCV(n) + \text{slave\_damping\_factor} * \text{AVG}(\text{slave\_change\_amount}) \quad (4)$$

Note that an equation for the slave change amount 602 in both slower and faster cases can be replaced by a product of a negative one and an Error divided by N, where N is the slave trigger event interval 604. The slave change amount 602 can be calculated with Equation 5 below:

$$\text{slave\_change\_amount} = -\text{Error}/N \quad (5)$$

where the Error is defined as:

If slave residual data<slave frequency control value/2, then

Error=slave_residue_data

Otherwise,

Error=(slave_residue_data−slave_frequency_control_value)

Figure 7:
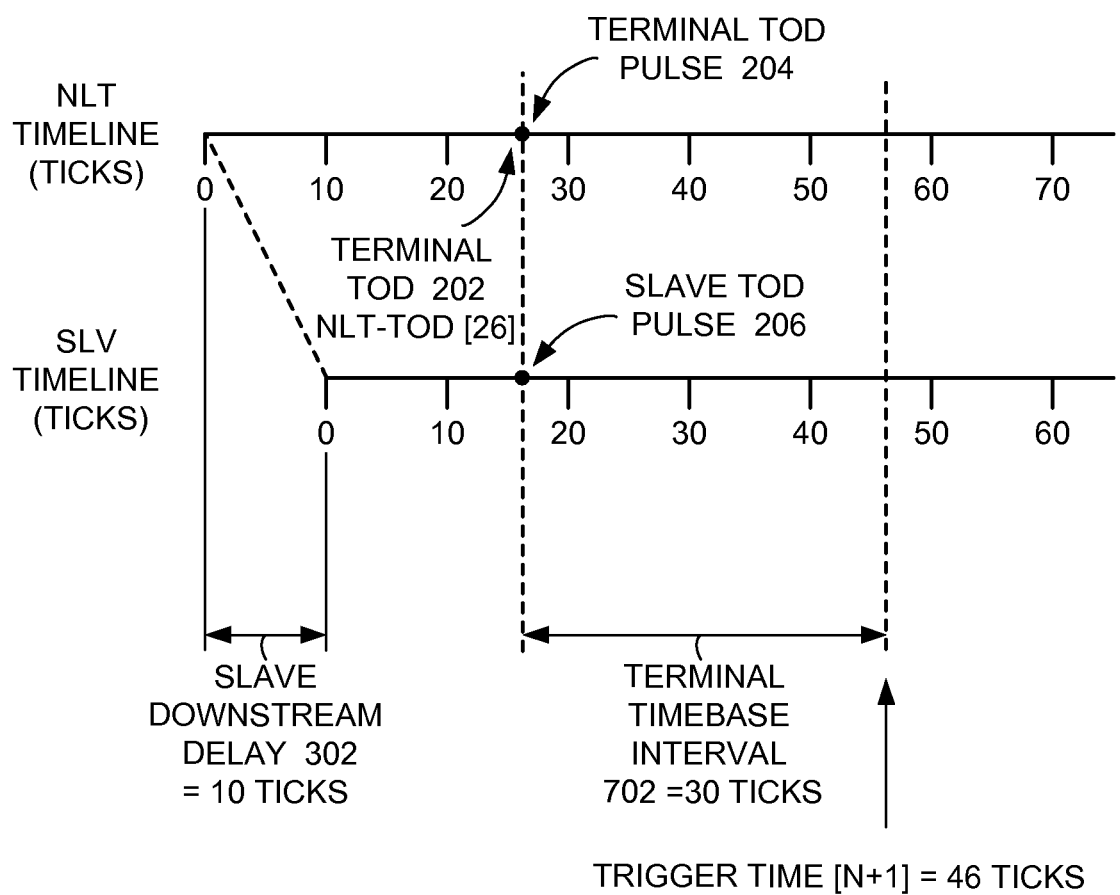
FIG. 7 is a timing diagram of the first slave network unit of FIG. 1 in a trigger prediction process.

Referring now to FIG. 7, therein is shown a timing diagram of the first slave network unit 112 of FIG. 1 in a trigger prediction process. The timing diagram is similar to the example timing diagram of FIG. 3, except that the timing diagram discusses the trigger prediction process.

Since a bit clock, such as a passive optical network (PON) bit clock, can be unlocked to the time of day (ToD) reference clock, a number of ticks, such as Media Access Control (MAC) timebase ticks, per second can be different than a calculated value of the number of the ticks based on a nominal bit rate of the bit clock. For example, the time of day (ToD) reference clock can be a Global Positioning System (GPS) clock.

Since the bit clock can be unlocked to the time of day (ToD) reference clock, there can be an offset between the bit clock and the time of day (ToD) reference clock. Such offset can be used to calculate or predict a Media Access Control (MAC) time value.

The terminal time message 214 of FIG. 2 from the network line terminal 102 of FIG. 1 can include the Media Access Control (MAC) timebase value and the terminal time of day 202 at the same instant. The first slave network unit 112 can track successive time messages from the network line terminal 102 and compute a number of Media Access Control (MAC) timebase ticks elapsed in N seconds between the time messages to estimate a number of Media Access Control (MAC) timebase ticks to use for any time interval.

The first slave network unit 112 can estimate a Media Access Control (MAC) timebase rate of the network line terminal 102. The estimated Media Access Control (MAC) timebase rate can be used by the first slave network unit 112 to predict time of day (ToD) events into the future.

For illustrative purposes, the first slave network unit 112 is shown skewed or delayed from the network line terminal 102 by the slave downstream delay 302. The slave downstream delay 302 can indicate a time of day offset between the network line terminal 102 and the first slave network unit 112.

The slave downstream delay 302 is designated as T_SLV_DS. When the terminal time of day pulse 204 occurs at the network line terminal 102 at time T, the slave time of day pulse 206 can occur at the first slave network unit 112 at time T−T_SLV_DS.

Since the terminal time of day pulse 204 cannot be known until after it happens at the network line terminal 102, the first slave network unit 112 can only create a suitable event at the next appropriate time. In this case, the next appropriate time can be the next 1-second instant into the future.

A new value of the slave trigger time 432 of FIG. 4 can be updated with the next appropriate time. The new value of the slave trigger time 432 can be calculated based on a current value of the terminal time of day 202 (NLT_ToD[n]), the slave downstream delay 302 (T_SLV_DS), and a terminal timebase interval 702, more specifically a duration that represents a number of ticks per second at the network line terminal 102.

The terminal timebase interval 702, designated as NLT_Ticks/s, can be calculated based on the estimated Media Access Control (MAC) timebase rate as previously described. The new value of the slave trigger time 432 can be calculated with a difference of the terminal time of day 202 and the slave downstream delay 302 and an addition of the difference and the terminal timebase interval 702. The new value of the slave trigger time 432, designated as slave_trigger_time[n+1], can be calculated with Equation 6 below:

$$\text{slave\_trigger\_time}[n+1] = NLT\_ToD[n] - T\_SLV\_DS + NLT\_Ticks/s \quad (6)$$

The terminal timebase interval 702 can be averaged to minimize noise in computations. It can also greatly increase prediction accuracy to calculate a fractional remainder for the slave trigger time 432 so that as the slave counter 412 of FIG. 4 at the first slave network unit 112 is updated, the slave fractional value 524 of FIG. 5 of the slave frequency control value 522 of FIG. 5 can be accounted.

For illustrative purposes, the current value of the terminal time of day 202, the slave downstream delay 302, and the terminal timebase interval 702 are shown as NLT_ToD[26] ticks, 10 ticks, and 30 ticks, respectively. As such, the new value of the slave trigger time 432 is shown at 46 ticks.

Figure 8:
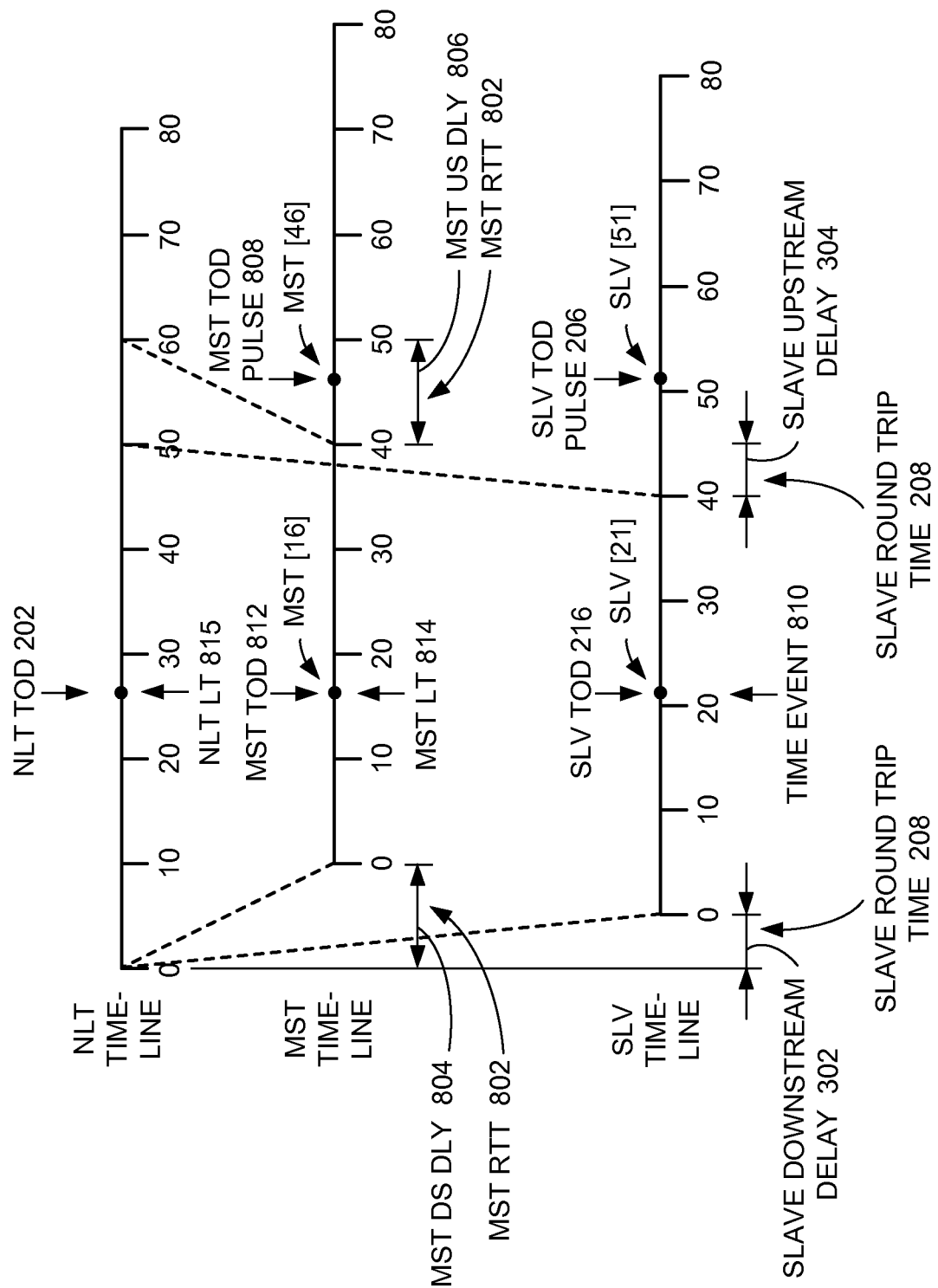
FIG. 8 is an example of a timing diagram of the master network unit of FIG. 1.

Referring now to FIG. 8, therein is shown an example of a timing diagram of the master network unit 114 of FIG. 1. The network system 100 of FIG. 1 can include a synchronization method, more specifically a method that utilizes a pulse per second mechanism, to synchronize the first slave network unit 112 of FIG. 1.

The synchronization method can be provided with the master network unit 114 rather than the network line terminal 102 of FIG. 1. In other words, the master network unit 114 instead of the network line terminal 102 can transmit information or messages to other network units. For example, the transmitted messages can include time of day (ToD), control, timing, any information related to synchronization, or a combination thereof.

The synchronization method can utilize timing relationships, more specifically timing components between the network line terminal 102 and the master network unit 114, in a new way. The master network unit 114 can send the timing relationships to the network units including the first slave network unit 112.

The network units can receive the timing relationships in order to be synchronized. The network units can use and compare the timing relationships to their timing relations to the network line terminal 102. With this simple comparison, each of the network units can become synchronized as if timing or reference signals originated from the network line terminal 102.

The master network unit 114 and the first slave network unit 112 can have a master-slave relationship such that the master network unit 114 can function as a master that provides time and the first slave network unit 112 can function as a slave that synchronizes to the time provided by the master network unit 114. The first slave network unit 112 can be synchronized by inserting the timing reference at the master network unit 114, designated as MST, rather than at the network line terminal 102, designated as NLT.

The synchronization method can be done within the network system 100 without changing the network line terminal 102. For example, the synchronization method can be used in Gigabit Passive Optical Network (GPON) systems.

The synchronization method can utilize a timing method to send Time of Day (ToD) information from one station to another station. For example, the master network unit 114 can receive time of day (ToD) alignment information from the network line terminal 102 with the ranging process.

The network system 100 can rely on an assessment of downstream fiber and processing delay components of each of the network units. When one or more of the network units are attached to the network line terminal 102, the delay components in the network line terminal 102 itself are irrelevant, but only relative delays between the master network unit 114 and the other network units are important, as will be discussed later.

The master network unit 114 can receive master round trip time 802, more specifically a sum of delays of a master downstream delay 804 and a master upstream delay 806 between the network line terminal 102 and the master network unit 114. The master round trip time 802 can be received from the network line terminal 102. The master round trip time 802 can be an established measurement of a connection between the network line terminal 102 and the master network unit 114.

The master downstream delay 804 is designated as T_MST_DS and more specifically a time delay from the network line terminal 102 to the master network unit 114. The master upstream delay 806 is designated as T_MST_US and more specifically a time delay from the master network unit 114 to the network line terminal 102. For illustrative purposes, the master round trip time 802 is shown as 20 ticks based on the master downstream delay 804 of 10 ticks and the master upstream delay 806 of 10 ticks.

The master network unit 114 can send messages to other network units that link the time of day (ToD) alignment information to a local Media Access Control (MAC) timebase value of each of the other network units. The messages can include information related to the master round trip time 802, such as the master downstream delay 804 and the master upstream delay 806. For example, the other network units can include the first slave network unit 112, the second slave network unit 116 of FIG. 1, the first network unit 106 of FIG. 1, the second network unit 108 of FIG. 1, or the nth network unit 110 of FIG. 1.

The first slave network unit 112 can receive the slave round trip time 208. For illustrative purposes, the first slave network unit 112 is shown being closer to the network line terminal 102 than the master network unit 114 to the network line terminal 102. Thus, the slave round trip time 208 is shown as 10 ticks based on the slave downstream delay 302, designated as T_SLV_DS, of 5 ticks and the slave upstream delay 304, designated as T_SLV_US, of 5 ticks.

For illustrative purposes, the time of day (ToD) instant is shown at time 16 ticks at the master network unit 114, designated as MST[16], and the time at the first slave network unit 112 is at 21 ticks, designated as SLV[21]. As an example, there are 30 ticks per second at both the master network unit 114 and the first slave network unit 112. The next time of day (ToD) second can occur at time 46 ticks at the master network unit 114, designated as MST[46], and at time 51 ticks at the first slave network unit 112, designated as SLV[51].

By configuring the first slave network unit 112 to trigger at 51 ticks, the slave time of day pulse 206 at SLV[51] can occur simultaneously with a master time of day pulse 808 as the time of day (ToD) reference at MST[46]. The master time of day pulse 808 is more specifically a strobe or an event that can be generated by hardware or logic to indicate when the time of day (ToD) is updated.

The master network unit 114 can send the time messages to other network units, including the first slave network unit 112. The time messages can be relayed or broadcasted when the master network unit 114 receives a time event 810, more specifically a time of day (ToD) event or a timing reference.

At the time event 810, a local Media Access Control (MAC) timebase can be sampled. For example, the time event 810 can be a pulse-per-second (PPS) pulse, a time of day (ToD) one-pulse-per-second (PPS) trigger event, a Global Positioning System (GPS) frequency reference, or a local master synchronization input.

The time messages can include a master time of day 812, designated as MST_ToD and more specifically a time of day (ToD) at the master network unit 114. For example, the master time of day 812 can be a time of day (ToD) string.

The time messages can also include a master local time 814, designated as MST_LT and more specifically a time in ticks at the master network unit 114. For example, the master local time 814 can be a Media Access Control (MAC) timebase value. The time messages can also include the information related to the master round trip time 802, including the master downstream delay 804 and the master upstream delay 806.

The first slave network unit 112 can compute the slave local time 218, designated as SLV_LT. The slave local time 218 can be calculated based on the master time of day 812 (MST_ToD), the master local time 814 (MST_LT), the master downstream delay 804 (T_MST_DS), the slave downstream delay 302 (T_SLV_DS), the slave timebase interval 308 of FIG. 3, or a combination thereof. It is understood that a time of day (ToD) value can be converted to a corresponding Media Access Control (MAC) timebase value, and vice versa.

For convenience in notation and ease of explanation, some equations below are expressed and described with downstream delay times (DS) as half of round trip times (RTT/2). These equations can be used for estimation of the downstream delay times. Based on refractive properties of optical fibers at different optical wavelengths, calculations of downstream delay times will be described in more details later.

The master downstream delay 804 can be estimated based on the master round trip time 802 (MST_RTT). The master downstream delay 804 (T_MST_DS) can be estimated with the master round trip time 802 divided by two. The master downstream delay 804 (T_MST_DS) can be estimated with Equation 7 below:

$$T\_MST\_DS = MST\_RTT/2 \qquad (7)$$

At the master local time 814 (MST_LT) of the master network unit 114, a terminal local time 815, designated as NLT_LT and more specifically a time in ticks at the network line terminal 102. For example, the terminal local time 815 can be a Media Access Control (MAC) timebase value.

The terminal local time 815 can be estimated based on the master local time 814 and the master downstream delay 804. The terminal local time 815 can be estimated with an addition of the master local time 814 and the master downstream delay 804. The terminal local time 815 (NLT_LT) can be estimated with Equation 8 below:

$$NLT\_LT=MST\_LT+T\_MST\_DS \qquad (8)$$

By substituting the master downstream delay 804 (T_MST_DS) in the Equation 8 with the Equation 7, the terminal local time 815 can be estimated with an addition of the master local time 814 and the master round trip time 802 divided by two. The terminal local time 815 (NLT_LT) can be estimated with Equation 9 below:

$$NLT\_LT=MST\_LT+MST\_RTT/2 \qquad (9)$$

The slave downstream delay 302 can be estimated based on the slave round trip time 208 (SLV_RTT). The slave downstream delay 302 can be estimated with the slave round trip time 208 divided by two. The slave downstream delay 302 (T_SLV_DS) can be estimated with Equation 10 below:

$$T\_SLV\_DS=SLV\_RTT/2 \qquad (10)$$

The slave local time 218 can be estimated based on the terminal local time 815 (NLT_LT) and the slave downstream delay 302 (T_SLV_DS). The slave local time 218 can be estimated with a difference of the terminal local time 815 and the slave downstream delay 302. The slave local time 218 (SLV_LT) can be estimated with Equation 11 below:

$$SLV\_LT=NLT\_LT-T\_SLV\_DS \qquad (11)$$

By substituting the slave downstream delay 302 (T_SLV_DS) in the Equation 11 with the Equation 10, the slave local time 218 can be estimated with a difference of the terminal local time 815 and the slave round trip time 208 divided by two. The slave local time 218 (SLV_LT) can be estimated with Equation 12 below:

$$SLV\_LT=NLT\_LT-SLV\_RTT/2 \qquad (12)$$

By substituting the terminal local time 815 (NLT_LT) in the Equation 12 with the Equation 9, the slave local time 218 (SLV_LT) can be estimated by adding the master round trip time 802 divided by two with the master local time 814 and substracting by the slave round trip time 208 divided by two. The slave local time 218 (SLV_LT) can be estimated with Equation 13 below:

$$SLV\_LT=(MST\_LT+MST\_RTT/2)-SLV\_RTT/2 \qquad (13)$$

Based on the Equation 13, the slave local time 218 can be determined without the terminal local time 815 but with the master local time 814, the master round trip time 802, and the slave round trip time 208. The calculation of the master round trip time 802 and the slave round trip time 208 can be improved and will be discussed later.

By substituting the master round trip time 802 divided by two (MST_RTT/2) and the slave round trip time 208 divided by two (SLV_RTT/2) in the Equation 13 with the Equations 7 and 10, respectively, the slave local time 218 (SLV_LT) can be calculated with an addition of the master local time 814 and the master downstream delay 804 and a difference of the addition and the slave downstream delay 302. The slave local time 218 (SLV_LT) can be calculated with Equation 14 below:

$$SLV\_LT=(MST\_LT+T\_MST\_DS)-T\_SLV\_DS \qquad (14)$$

The slave time of day 216 can be determined without the terminal time of day 202 of FIG. 2. The slave time of day 216 can be determined with the master time of day 812 (MST_ToD), the master downstream delay 804 (T_MST_DS), and the slave downstream delay 302 (T_SLV_DS).

The slave time of day 216 can be calculated based on the master time of day 812 added with the master downstream delay 804 and subtracted by the slave downstream delay 302. The slave time of day 216 can be calculated with an addition of the master time of day 812 and the master downstream delay 804 and a difference of the addition and the slave downstream delay 302. The slave time of day 216, designated as SLV_ToD, can be calculated with Equation 15 below:

$$SLV\_ToD=(MST\_ToD+T\_MST\_DS)-T\_SLV\_DS \qquad (15)$$

For illustrative purposes, at the time of day (ToD) instant, the master local time 814 is shown at MST [16] or 16 ticks at the master network unit 114. The master downstream delay 804 and the slave downstream delay 302 are shown as 10 ticks and 5 ticks, respectively. At the same time of day (ToD) instant, the slave local time 218 can be calculated with an addition of the master local time 814 and the master downstream delay 804 and a difference of the addition and the slave downstream delay 302. The slave local time 218 is shown at SLV[21] or 21 ticks and is calculated with Equation 16 below:

$$SLV\_LT=MST\_LT+T\_MST\_DS-T\_SLV\_DS=16+10-5=21 \qquad (16)$$

With information including the master time of day 812 and the master local time 814, the first slave network unit 112 can compute other factors including a prediction of what the next value of the slave local time 218 can be for any time of day (ToD). This can be important since ideally in a causal system, time has already elapsed beyond the time indicated by the current or calculated value of the slave local time 218 or the current time of day (ToD).

The first slave network unit 112 can essentially predict each time of day (ToD) second. The first slave network unit 112 can also maintain a tracking loop that can measure a potential drift between a free-running bit clock, which can include a passive optical network (PON) bit clock, and the timing reference, which can include a Global Positioning System (GPS) master reference.

Figure 9:
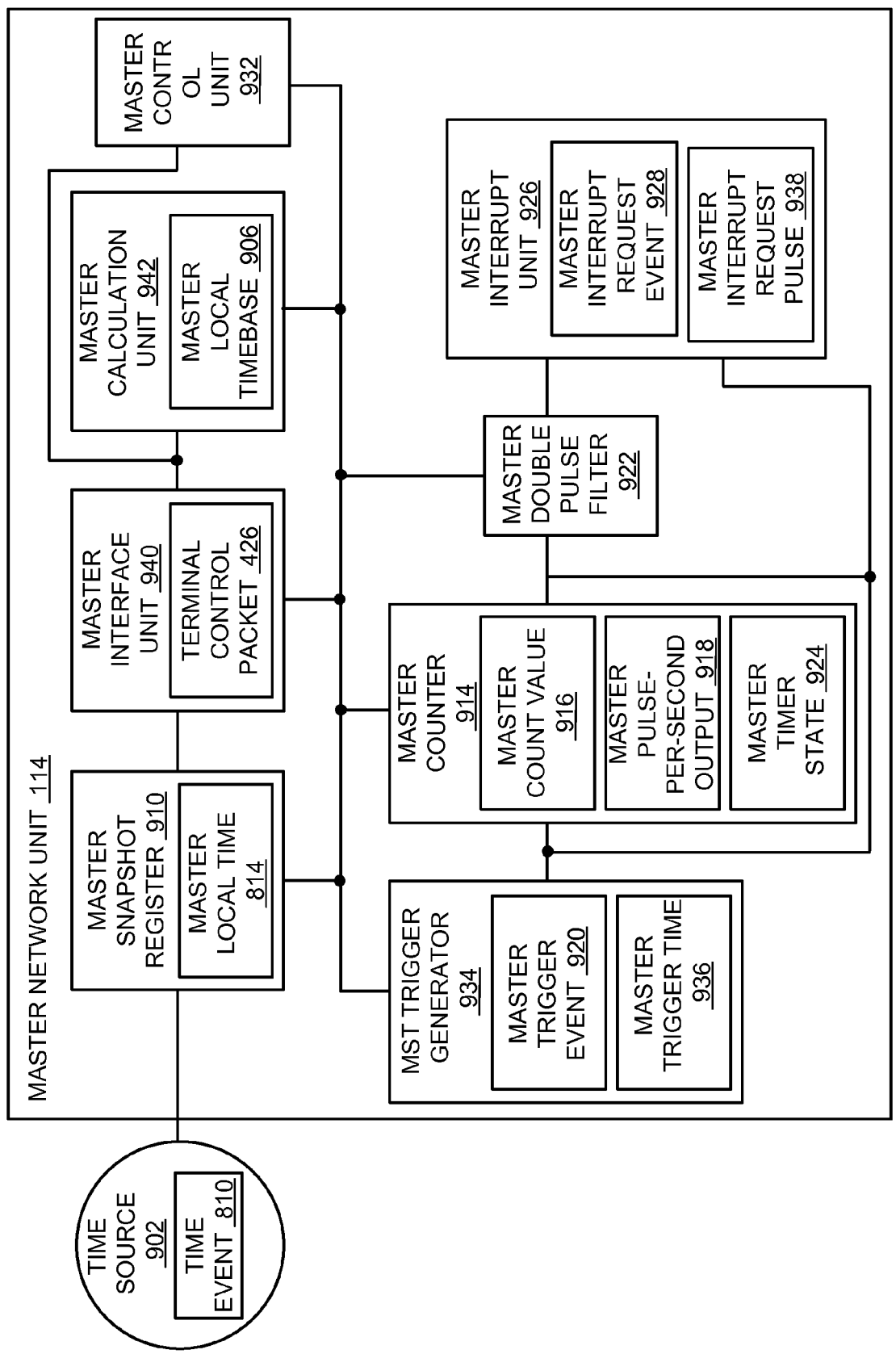
FIG. 9 is a block diagram of a portion of the master network unit.

Referring now to FIG. 9, therein is shown a block diagram of a portion of the master network unit 114. The master network unit 114 can be connected to a time source 902, more specifically a Global Positioning System (GPS) or any other sources that provide clock sources or reference clocks. For example, the time source 902 can include a pulse-per-second (PPS) interface or a packet based time protocol.

The time source 902 can send the time event 810, more specifically a time of day (ToD) event or a timing reference, to the master network unit 114. For example, the time source 902 can provide a direct pulse input to establish the time event 810.

The master network unit 114 can be connected to the network line terminal 102 of FIG. 1 via the first network 104 of FIG. 1. The master network unit 114 can generate a master local timebase 906, more specifically a Media Access Control (MAC) timebase value or a Precision Time Protocol (PTP) timestamping counter value. For example, the master local timebase 906 can be a downstream (DS) passive optical network (PON) Media Access Control (MAC) timebase or a local Media Access Control (MAC) timebase.

The master network unit 114 can be registered to the network line terminal 102 and locked to a bit clock frequency of the network line terminal 102. The master local timebase 906 can be calculated based on the terminal local time 815 of FIG. 8. The master local timebase 906 can be offset from the terminal local time 815.

The master network unit 114 can sample the master local timebase 906 when the time event 810 occurs. The master network unit 114 can sample and store the master local timebase 906 with a master snapshot register 910, more specifically a hardware unit or a storage device that can be used to store data or information. The master snapshot register 910 can sample the master local timebase 906 by capturing or acquiring a value of the master local timebase 906.

The master snapshot register 910 can generate the master local time 814 based on the master local timebase 906. The master local time 814 can be a captured value of the master local timebase 906.

The master local time 814 includes information that is stored in the master snapshot register 910. For example, the master local time 814 can include a local passive optical network (PON) Media Access Control (MAC) timebase value or a local PTP timestamping counter value, which can be used to perform IEEE-1588 timing protocol operations (for timestamping ingress packets and for computing residence time correction of egress packets).

The master network unit 114 can include a master counter 914, more specifically a hardware unit that functions as a timer. The master counter 914 can generate a free-running pulse-per-second (PPS) pulse train. For example, the master counter 914 can be the free-running local timer, a local hardware counter, or a local one-pulse-per-second (PPS) timer.

The master counter 914 can have a precision of approximately less than 10 nanoseconds (ns) and a dynamic range of approximately one second (sec). The master counter 914 can be used to implement a pulse-per-second (PPS) timer with a suitable tracking resolution. For example, the master counter 914 can have a resolution that is based on a synchronization application and is no more than approximately ¼ of a system timing jitter budget.

The master counter 914 can have the dynamic range that is wide enough to handle a pulse-per-second (PPS) event plus a specified network frequency accuracy. For example, the specified network frequency accuracy can be approximately 50 parts per million (ppm).

The master counter 914 can keep track of a master count value 916. For example, the master count value 916 can be decremented.

The master counter 914 can generate a master pulse-per-second output 918, more specifically a strobe or an event that occurs once in each timer duration. In other words, when the timer duration is reached, the master counter 914 can generate the master pulse-per-second output 918, and the master counter 914 can be automatically reset or restarted.

The master counter 914 can be restarted by reloading the master counter 914 with the timer duration and then decrement. The master counter 914 can be operated at a local timer frequency.

The master counter 914 can detect when a master trigger event 920 occurs. The master trigger event 920 is more specifically a strobe or trigger that is generated every second based on a time of day (ToD) or the time event 810. The master counter 914 can be used to measure a local clock by counting a number of ticks per the master trigger event 920.

The master pulse-per-second output 918 can be generated based on the master trigger event 920. If the master trigger event 920 occurs before the master counter 914 reaches the timer duration, the master counter 914 can terminate, generate the master pulse-per-second output 918, and restart.

If the master trigger event 920 occurs just after the master counter 914 is automatically restarted, the master counter 914 can be restarted. For such case, a master double pulse filter 922, more specifically a hardware unit that generates an output that does not have two pulses that occur within a predetermined duration, can be implemented.

The master double pulse filter 922 can receive the master pulse-per-second output 918 and the master trigger event 920 to generate a pulse output. The master double pulse filter 922 can be coupled to the master counter 914.

The master double pulse filter 922 can use a blanking window for a double pulse filtering process to generate the pulse output. The blanking window is defined as a predetermined time duration in which a pulse is not output or prevented from being output. The blanking window can be sufficient to accommodate a local frequency error of 20 parts per million (ppm).

The master counter 914 can generate a master timer state 924, more specifically a state of the master counter 914 based on the master trigger event 920. The master timer state 924 can be recorded to indicate if the master counter 914 reaches the timer duration earlier or later than the master trigger event 920. For example, when the master trigger event 920 is received, the master timer state 924 can be saved to provide control information to synchronize the slave network units and to measure a frequency offset of a Media Access Control (MAC) timebase clock, which can be based on the bit clock.

As such, the master timer state 924 can be used to estimate a frequency offset of the local reference clock of the master counter 914 and a time of day (ToD) reference clock with which the master trigger event 920 can be generated. The time of day (ToD) reference clock can be sourced from Global Positioning System (GPS).

A master interrupt unit 926, more specifically a hardware unit that generates a request for service can receive the pulse output from the master double pulse filter 922 and generate a master interrupt request event 928, more specifically a command to indicate that a one-pulse-per-second (1 PPS) local pulse is generated. The master interrupt unit 926 can be coupled to the master double pulse filter 922.

The master interrupt request event 928 can allow software (SW) to maintain the master local timebase 906 in software. The master interrupt request event 928 can also trigger a time of day (ToD) ASCII string transmission with a universal asynchronous receiver/transmitter (UART) interface.

The master network unit 114 can receive the terminal control packet 426. The terminal control packet 426 can be received by a master control unit 932, more specifically a hardware unit that executes functions of the master network unit 114.

The terminal control packet 426 can include time of day (ToD) control information. For example, the terminal control packet 426 can be received by the master control unit 932 and processed by software. Also for example, the terminal control packet 426 can be a pulse-per-second (PPS) Media Access Control (MAC) control packet.

A master trigger generator 934, more specifically a hardware unit that functions as a timer, can generate the master trigger event 920 by keeping track of or counting a local timebase (e.g. a PON MAC local timebase). The master trigger event 920 can be generated based on a master trigger time 936, more specifically a time at which a trigger event is asserted.

When the local timebase reaches the master trigger time 936, the master trigger event 920 is asserted or active. For example, the master trigger time 936 can be configured by software. Also for example, the master trigger event 920 can be generated by the master network unit 114 in applications for bridging IEEE1588 and pulse-per-second (PPS) timing methods.

For illustrative purposes, the block diagram is shown with the master trigger event 920 generated by the master trigger generator 934 based on the master trigger time 936, although the master trigger event 920 can be generated differently. For example, the master trigger event 920 as a master synchronization event can be input from a reference (e.g. a GPS frequency reference) to the master network unit 114.

The master interrupt unit 926 can receive the master trigger event 920, which can be generated based on the time event 810. When the master trigger event 920 is asserted, the master interrupt unit 926 can generate a master interrupt request pulse 938, more specifically a command to indicate that a one-pulse-per-second (PPS) local event is active.

The master network unit 114 can include a master interface unit 940, more specifically a hardware unit that transmits and receives information to and from the master network unit 114. For example, the master interface unit 940 can enable external communication to and from the master network unit 114 to communicate with the network line terminal 102, the first slave network unit 112 of FIG. 1, any other network units, the first network 104, and an attachment, such as a peripheral device or a computer desktop. Also for example, the master interface unit 940 can receive the terminal control packet 426 and send it to the master control unit 932 to process.

The master network unit 114 can include a master calculation unit 942, more specifically a hardware unit that computes data for the master network unit 114. For example, the computed data can be performed by the master calculation unit 942 for purposes of time of day (ToD) synchronization.

As an example, the master calculation unit 942 can calculate the master local timebase 906. As another example, the master calculation unit 942 can calculate an integer portion of the master local timebase 906 based on the master pulse-per-second output 918 and the software can calculate a fractional portion of the master local timebase 906.

For illustrative purposes, the master network unit 114 is shown with hardware units, although the master network unit 114 can be implemented differently. For example, the hardware units shown are the master counter 914, the master double pulse filter 922, the master interrupt unit 926, the master control unit 932, the master trigger generator 934, the master interface unit 940, and the master calculation unit 942.

As an example, the master counter 914 can be implemented differently by using the master control unit 932, such as a processor, an embedded processor, a microprocessor, a hardware control logic, a hardware finite state machine (FSM), a digital signal processor (DSP), or a combination thereof. As another example, the master control unit 932 can execute a software to provide intelligence for the master network unit 114.

Figure 10:
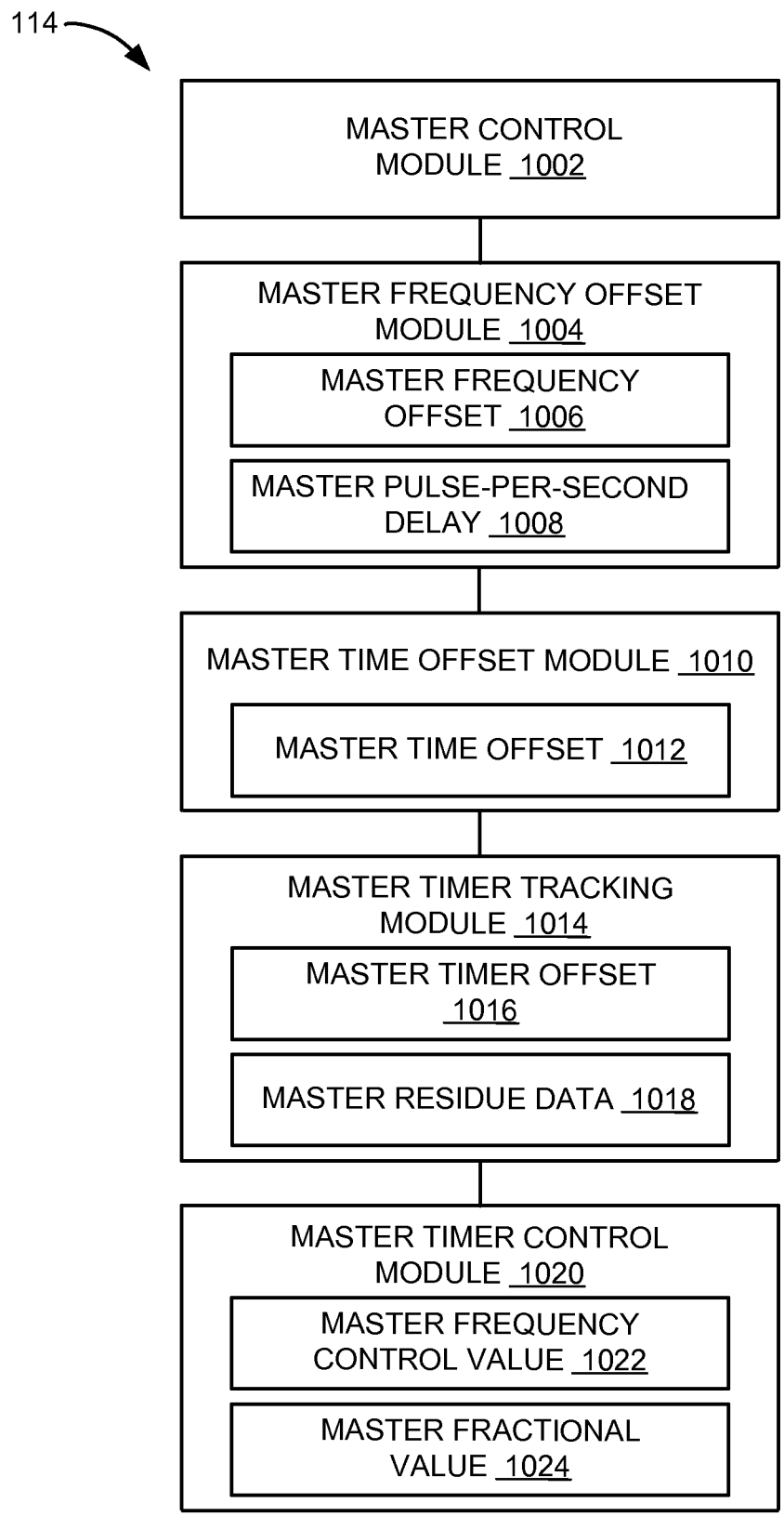
FIG. 10 is a flow chart of a portion of the master network unit.

Referring now to FIG. 10, therein is shown a flow chart of a portion of the master network unit 114. The master network unit 114 can include a master control module 1002 to control the master control unit 932 of FIG. 9. For example, the master control module 1002 can configure the master control unit 932 to configure a hardware forwarding path to transmit the terminal control packet 426 of FIG. 4 to the slave network units including the first slave network unit 112 of FIG. 1.

The master network unit 114 can include a master frequency offset module 1004 to estimate a master frequency offset 1006, more particularly a frequency difference or shift between the time of day (ToD) reference clock and a recovered clock. The recovered clock is more specifically a passive optical network (PON) serial clock frequency or a clock that is recovered from a downstream signal from the network line terminal 102 of FIG. 1 to the master network unit 114.

For example, the master frequency offset 1006 can be a local pulse-per-second (PPS) frequency offset. The master frequency offset module 1004 can be coupled to the master control module 1002.

The master frequency offset 1006 can be a bit clock offset, which is a measure of the bit clock, of which the frequency is an attribute of a frequency reference that is based on a clock of the network line terminal 102. The master network unit 114 can use the master frequency offset 1006 to predict pulse-per-second (PPS) events into the future. The pulse-per-second (PPS) events into the future can be predicted based on Media Access Control (MAC) time ticks per second, which can be measured based on the time event 810 of FIG. 8.

The master frequency offset module 1004 can record a master pulse-per-second delay 1008, more specifically a Media Access Control (MAC) pulse-per-second (PPS) time. The master pulse-per-second delay 1008 can include a fractional resolution of Media Access Control (MAC) timebase ticks. The master pulse-per-second delay 1008 can be used to predict a Media Access Control (MAC) timebase value at any arbitrary time of day (ToD).

The master network unit 114 can include a master time offset module 1010 to estimate a master time offset 1012, more specifically a measurement of changes in the master round trip time 802 of FIG. 8. The master time offset module 1010 can be coupled to the master frequency offset module 1004.

The master time offset module 1010 can differentiate or filter the changes in the master round trip time 802 from changes in a relative clock frequency. In other words, as the master round trip time 802 changes, there can be an increase or a decrease in a number of Media Access Control (MAC) timebase ticks between time of day (ToD) messages. The master time offset 1012 cannot be used in the master frequency offset module 1004 as the master time offset 1012 is due to, not a frequency movement, but a time offset movement.

The master network unit 114 can include a master timer tracking module 1014 to track a master timer offset 1016, more specifically an offset of the local timer frequency. The local timer frequency can be a clock rate at which the master counter 914 of FIG. 9 operates. The local timer frequency can also be the same frequency of a local clock that used to operate the master network unit 114. The master timer tracking module 1014 can be coupled to the master time offset module 1010.

The master timer offset 1016 can be determined by collecting master residue data 1018, more specifically a value of the master counter 914 that is sampled based on the master interrupt request pulse 938 of FIG. 9 whenever the master trigger event 920 occurs. The master residue data 1018 can indicate a magnitude and a sign of the master frequency offset 1006.

The master network unit 114 can include a master timer control module 1020 to generate a master frequency control value 1022, more specifically a timer value that is used to configure the master counter 914 to generate the master pulse-per-second output 918 of FIG. 9 having a repetition period. As such, the master pulse-per-second output 918 of FIG. 9 can be controlled by the master frequency control value 1022. For example, the master frequency control value 1022 can be a software local pulse-per-second (PPS) timer frequency control word (FCW) or the timer duration.

The master frequency control value 1022 can optionally include a master fractional value 1024, more specifically a tick resolution. With the master fractional value 1024, the master frequency control value 1022 can be provided so that the master counter 914 can be properly controlled.

The master counter 914 can be properly controlled with the master frequency control value 1022 having the master fractional value 1024 by the master timer control module 1020 employing a dithering mechanism to minimize a drift and jitter characteristic of the master pulse-per-second output 918 of the master counter 914. The dithering mechanism can include a method of varying the master frequency control value 1022 by changing the master fractional value 1024 by a predetermined value.

The master frequency control value 1022 can be updated with a slow process. For example, the master frequency control value 1022 can be changed after several seconds have elapsed since the last update.

The flow chart is described with the module functions or order as an example. The modules can be partitioned differently. For example, the master frequency offset module 1004 and the master timer tracking module 1014 are shown as separate modules, although the master frequency offset module 1004 and the master timer tracking module 1014 can be implemented in a single module. Also for example, the master frequency offset module 1004 is shown before the master time offset module 1010, although the master frequency offset module 1004 can be executed after the master time offset module 1010.

Each of the modules can operate individually and independently of the other modules. For example, the master control module 1002 can be executed during an initialization of the master network unit 114. Also for example, the master timer tracking module 1014 can be executed based on an interrupt driven mechanism. In other words, the master timer tracking module 1014 is executed when the master timer tracking module 1014 receives the master interrupt request pulse 938 of FIG. 9.

The modules can be implemented with the hardware units of the master network unit 114 and the software executed by the master control unit 932. For example, the modules can be implemented by the master counter 914, the master double pulse filter 922 of FIG. 9, the master interrupt unit 926 of FIG. 9, the master control unit 932, the master trigger generator 934 of FIG. 9, the master interface unit 940 of FIG. 9, the master calculation unit 942 of FIG. 9, the software, or a combination thereof.

Figure 11:
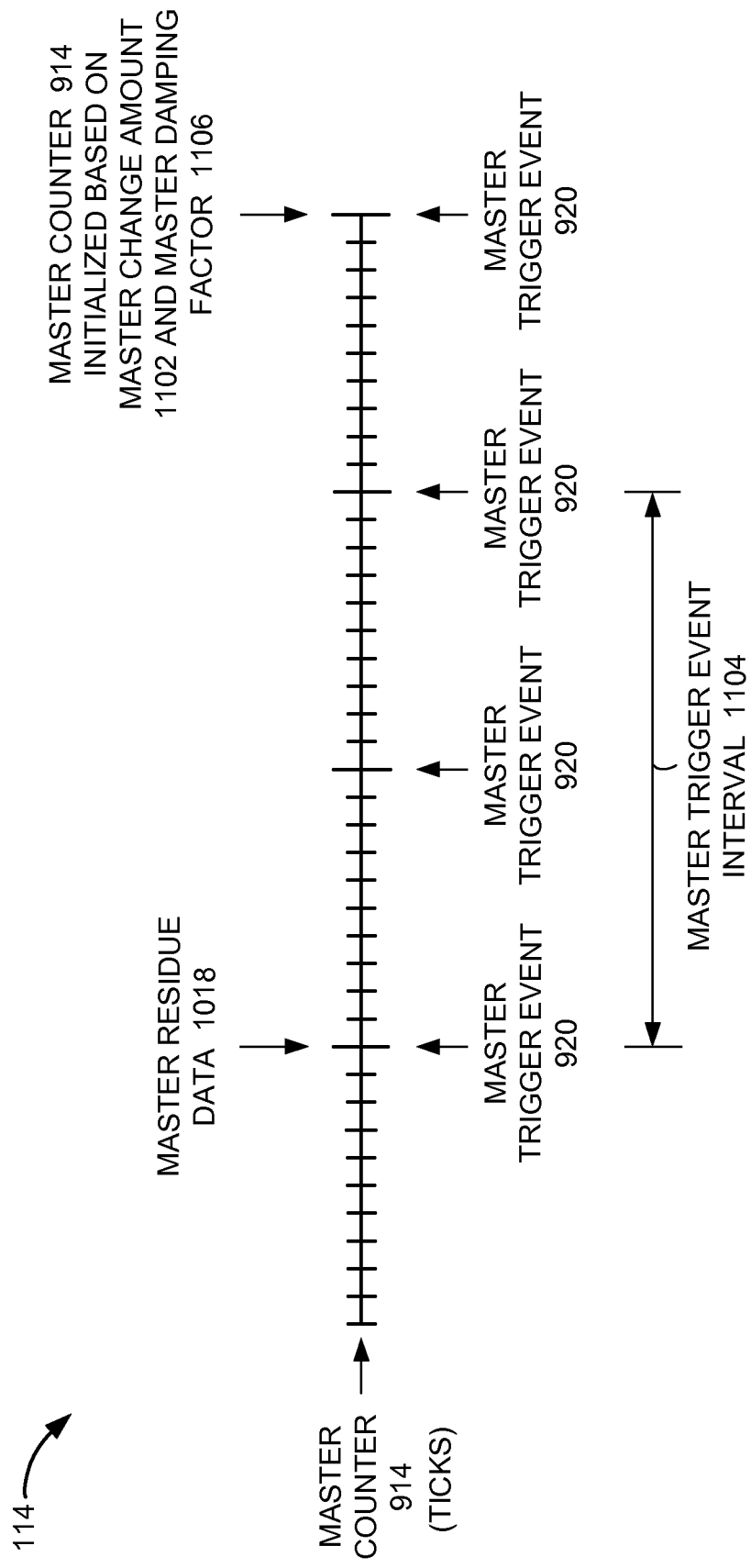
FIG. 11 is a timing diagram of the master network unit in a frequency adjustment process.

Referring now to FIG. 11, therein is shown a timing diagram of the master network unit 114 in a frequency adjustment process. When the master trigger event 920 occurs, the master network unit 114 can capture and save the master residue data 1018 of FIG. 10 of the master counter 914.

The master trigger event 920 can represent a true one-second event. Depending on the value obtained, the master network unit 114 can determine if the local timer frequency is running slower or faster than a pre-determined nominal rate based on the master timer state 924 of FIG. 9.

The master counter 914 can be initialized by loading the master counter 914 with the master frequency control value 1022 of FIG. 10 and then decrement. When the local timer frequency is equal to the pre-determined nominal rate, the master count value 916 of FIG. 9 reaches a value of zero when the master trigger event 920 occurs. The master timer control module 1020 of FIG. 10 can update the master frequency control value 1022 based on the master interrupt request pulse 938 of FIG. 9 generated when the master trigger event 920 occurs.

When the local timer frequency is slower than the pre-determined nominal rate and the master counter 914 is loaded with a pre-determined nominal value of the master frequency control value 1022, the master counter 914 has not reached zero when a true one-second event occurs. As such, the master network unit 114 can reduce the master frequency control value 1022 by a master change amount 1102, more specifically an appropriate amount used to adjust the master frequency control value 1022 in order for the master counter 914 to generate the master pulse-per-second output 918 of FIG. 9 having a correct pulse-per-second (PPS) pulse period.

The master change amount 1102 can be calculated based on the master residue data 1018 and a master trigger event interval 1104, more specifically a duration between pre-determined occurences of the master trigger event 920. For illustrative purposes, the master trigger event interval 1104 is shown as a duration between two pre-determined occurences of the master trigger event 920 that are 2 seconds apart. For example, the master residue data 1018 of the master counter 914 has a value of 2 (ticks) when the master trigger event 920 occurs.

In this slower case, the master residue data 1018 can be a small integer, which can be close to zero. If the master trigger event interval 1104 between the pre-determined occurences of the master trigger event 920 is N seconds, then the master change amount 1102 can be calculated with a product of a negative one and the master residue data 1018 divided by N, where N is the master trigger event interval 1104. The master change amount 1102 can be calculated with Equation 17 below:

$$\text{master\_change\_amount} = \text{master\_residue\_data}/N \quad (17)$$

To prevent jitter, the master change amount 1102 can be averaged based on values of the master residue data 1018 captured in a number of times during the master trigger event interval 1104. An average value of the captured values of the master residue data 1018, designated as AVG(master change amount), can be calculated before the average value is applied to a tracking loop.

To limit amounts of overshoot and hunting, a master damping factor 1106 can be applied. A reasonable value of the master damping factor 1106 can preferably be 0.5. For illustrative purposes, let a current value of the master frequency control value 1022 be designated as FCV(n).

The next value of the master frequency control value 1022 can be calculated with an addition of the current value of the master frequency control value 1022 and a product of the master damping factor 1106 and the average value of the captured values of the master residue data 1018. The next value of the master frequency control value 1022, designated as FCV(n+1), can be calculated and updated with Equation 18 below:

$$FCV(n+1) = FCV(n) + \text{master\_damping\_factor} * \text{AVG}(\text{master\_change\_amount}) \quad (18)$$

When the local timer frequency is faster than the pre-determined nominal rate and the master counter 914 is loaded with the pre-determined nominal value of the master frequency control value 1022, the master counter 914 has reached zero before the true one-second event occurs and begins to count down from the master frequency control value 1022 again. As such, the master network unit 114 can increase the master frequency control value 1022 by a different value for the master change amount 1102.

The master change amount 1102 can be calculated based on the master residue data 1018 and the master trigger event interval 1104. For illustrative purposes, the master trigger event interval 1104 is shown as a duration between two pre-determined occurences of the master trigger event 920 that are 2 seconds apart. For example, the master residue data 1018 of the master counter 914 has a value of 8 (ticks) when the master trigger event 920 occurs.

In this faster case, the master residue data 1018 can be a large integer, which can be close to the master frequency control value 1022. If the master trigger event interval 1104 between the pre-determined occurences of the master trigger event 920 is N seconds, then the master change amount 1102 can be calculated with a difference of the master residue data 1018 and the master frequency control value 1022 and a product of a negative one and the difference divided by N, where N is the master trigger event interval 1104. The master change amount 1102 can be calculated with Equation 19 below:

$$master\_change\_amount=-(master\_residue\_data-master\_frequency\_control\_value)/N \quad (19)$$

To prevent jitter, the master change amount 1102 can be averaged based on values of the master residue data 1018 captured in a number of times during the master trigger event interval 1104. An average value of the captured values of the master residue data 1018, designated as AVG(master change amount), can be calculated before the average value is applied to a tracking loop.

To limit amounts of overshoot and hunting, the master damping factor 1106 can be applied. A reasonable value of the master damping factor 1106 is preferably 0.5. For illustrative purposes, let a current value of the master frequency control value 1022 be designated as FCV(n).

The next value of the master frequency control value 1022 can be calculated with an addition of the current value of the master frequency control value 1022 and a product of the master damping factor 1106 and the average value of the captured values of the master residue data 1018. The next value of the master frequency control value 1022, designated as FCV(n+1), can be calculated and updated with Equation 20 below:

$$FCV(n+1)=FCV(n)+master\_damping\_factor*AVG(master\_change\_amount) \quad (20)$$

Note that an equation for the master change amount 1102 in both slower and faster cases can be replaced by a product of a negative one and an Error divided by N, where N is the master trigger event interval 1104. The master change amount 1102 can be calculated with Equation 21 below:

$$master\_change\_amount=-Error/N \quad (21)$$

where the Error is defined as:
If master residual data<master frequency control value/2, then $$Error=master\_residue\_data$$

Otherwise, $$Error=(master\_residue\_data-master\_frequency\_control\_value)$$

Figure 12:
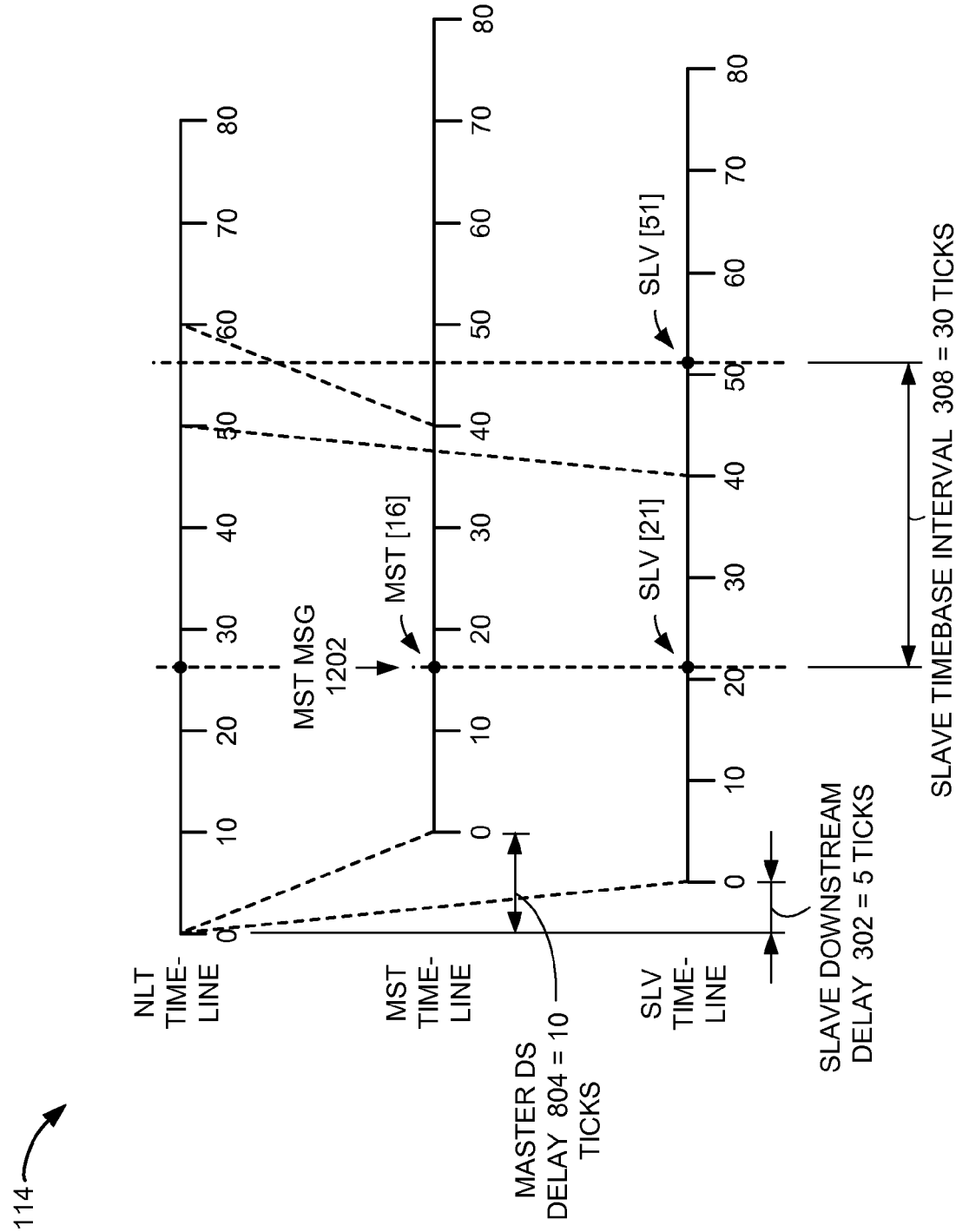
FIG. 12 is a timing diagram of the master network unit in a trigger prediction process.

Referring now to FIG. 12, therein is shown a timing diagram of the master network unit 114 in a trigger prediction process. Since a bit clock, such as a passive optical network (PON) bit clock, can be unlocked to the time of day (ToD) reference, a number of ticks, such as Media Access Control (MAC) timebase ticks, per second can be different than a calculated value of the number of the ticks based on a nominal bit rate of the bit clock.

Each time the master local timebase 906 of FIG. 9 is sampled, a master message 1202 can be generated and sent by the master control unit 932 of FIG. 9 of the master network unit 114. For example, the master message 1202 can be the synchronization control message. The master message 1202 is more specifically information including the time messages, the master round trip time 802 of FIG. 8, the master time of day 812 of FIG. 8, the master local time 814 of FIG. 8, or a combination thereof.

For example, the slave counter 412 of FIG. 4 can generate the slave count value 414 of FIG. 4 based on the master message 1202. Also for example, the slave interface unit 436 of FIG. 4 can receive the master message 1202 without responding to the master message 1202.

The first slave network unit 112 of FIG. 1 can be synchronized by synchronizing the slave local time 218 of FIG. 2 with the master local time 814 without the first slave network unit 112 responding to the master message 1202. Without the first slave network unit 112 responding to the master message 1202 means the first slave network unit 112 does not send a reply message to the master network unit 114 after the first slave network unit 112 receives the master message 1202, thereby achieving uni-directional message communication.

As an example, the first slave network unit 112 can be synchronized by having the slave calculation unit 438 of FIG. 4 calculating the slave time of day 216 of FIG. 2 or the slave local time 218 of FIG. 2 based on the master message 1202 and the slave downstream delay 302. As another example, the slave control unit 428 of FIG. 4 can generate the slave trigger event 306 of FIG. 3 based on the master message 1202.

For example, the master control unit 932 can generate the master message 1202. Also for example, the master interface unit 940 of FIG. 9 can send the master message 1202. Further, for example, the master calculation unit 942 of FIG. 9 can calculate the master time of day 812.

The master message 1202 can include the master time of day 812 and the master local time 814 at the same instant. The first slave network unit 112 of FIG. 1 can receive a plurality of the master message 1202. For example, the master message 1202 can be generated or processed by a protocol layer, including a Data Link layer (Layer 2), a Network layer (Layer 3), or a Transport layer (Layer 4), at the master network unit 114, the network line terminal 102, and the first slave network unit 112.

The master message 1202 can be sent from the master network unit 114 to the network line terminal 102. Then, the master message 1202 can be relayed and sent from the network line terminal 102 to the first slave network unit 112.

The master message 1202 can be sent as a unicast message, a multicast message, or a broadcast message. More specifically, the unicast message, the multicast message, and the broadcast message are information transmitted to one of the network units, multiple of the network units, and a number of the network units, respectively. For example, broadcast can be controlled within networking domains based on virtual local area networks (VLANs), and so not all network units or stations can receive the broadcast message.

For example, the master network unit 114 can send the master message 1202 as the unicast message to just the first slave network unit 112. Also for example, the master network unit 114 can send the master message 1202 as the multicast message to the first slave network unit 112 and the second slave network unit 116 of FIG. 1. Further, for example, the master network unit 114 can send the master message 1202 as the broadcast message to all other network units, including the first network unit 106 of FIG. 1 to the nth network unit 110 of FIG. 1, the first slave network unit 112, and the second slave network unit 116.

The first slave network unit 112 can compute a number of Media Access Control (MAC) timebase ticks elapsed in N seconds between the plurality of the master message 1202 to estimate a number of Media Access Control (MAC) timebase ticks to use for any time interval. For example, the first slave network unit 112 can receive the master message 1202 with the master time of day 812 and the master local time 814 to generate the slave trigger event 306 or the slave frequency offset 506 of FIG. 5.

The first slave network unit 112 can estimate a Media Access Control (MAC) timebase rate of the master message 1202. The estimated Media Access Control (MAC) timebase rate can be used by the first slave network unit 112 to predict time of day (ToD) events into the future. The time of day (ToD) events into the future can be predicted since there can be no clock drift in the bit clock at the time of the prediction.

For illustrative purposes, the first slave network unit 112 and the master network unit 114 are skewed or delayed from the network line terminal 102 of FIG. 1 by the slave downstream delay 302 and the master downstream delay 804, respectively. The slave downstream delay 302 and the master downstream delay 804 can indicate time of day offsets between the network line terminal 102 and the first slave network unit 112 and the master network unit 114, respectively.

When the master message 1202 arrives at the slave network unit 112, data fields of the master message 1202 can be parsed and used in computations by the slave network unit 112. Due to causality, the slave network unit 112 can compute the next time of day (ToD) second as the slave trigger time 432 of FIG. 4.

The slave downstream delay 302 and the master downstream delay 804 are designated as T_SLV_DS and T_MST_DS, respectively. When the master time of day pulse 808 of FIG. 8 occurs at the master network unit 114 at time T, the slave time of day pulse 206 of FIG. 2 can occur at the first slave network unit 112 at time T+(T_MST_DS−T_SLV_DS).

Since the master time of day pulse 808 cannot be known until after it happens at the master network unit 114, the first slave network unit 112 can only create a suitable event at the next appropriate time. In this case, the next appropriate time can be the next 1-second instant into the future.

A new value of the slave trigger time 432 of FIG. 4 can be updated with the next appropriate time. The new value of the slave trigger time 432 can be calculated based on a current value of the master local time 814 (MST_LT[n]), the master downstream delay 804 (T_MST_DS), the slave downstream delay 302 (T_SLV_DS), and the slave timebase interval 308 (SLV_Ticks/s). The slave timebase interval 308 can be calculated by averaging a time lapse or duration of the master message 1202 and a number of Media Access Control (MAC) time ticks across the time lapse.

The new value of the slave trigger time 432 can be calculated with a difference of the master downstream delay 804 and the slave downstream delay 302 and an addition of the current value of the master local time 814, the difference, and the slave timebase interval 308. The new value of the slave trigger time 432, designated as slave trigger time[n+1], can be calculated with Equation 22 below:

$$\text{slave\_trigger\_time}[n+1] = MST\_LT[n] + (T\_MST\_DS - T\_SLV\_DS) + SLV\_\text{Ticks}/s \quad (22)$$

The master local time 814 can be averaged to minimize noise in computations. The master local time 814 can be reported and included in the master message 1202. It can also greatly increase prediction accuracy to calculate a fractional remainder for the slave trigger time 432 so that as the slave counter 412 at the first slave network unit 112 is updated, the slave fractional value 524 of FIG. 5 of the slave frequency control value 522 of FIG. 5 can be accounted.

For illustrative purposes, the current value of the master local time 814, the master downstream delay 804, the slave downstream delay 302, and the slave timebase interval 308 are shown as MST[16], 10 ticks, 5 ticks, and 30 ticks, respectively. As such, the new value of the slave trigger time 432 is shown at SLV[51].

Figure 13:
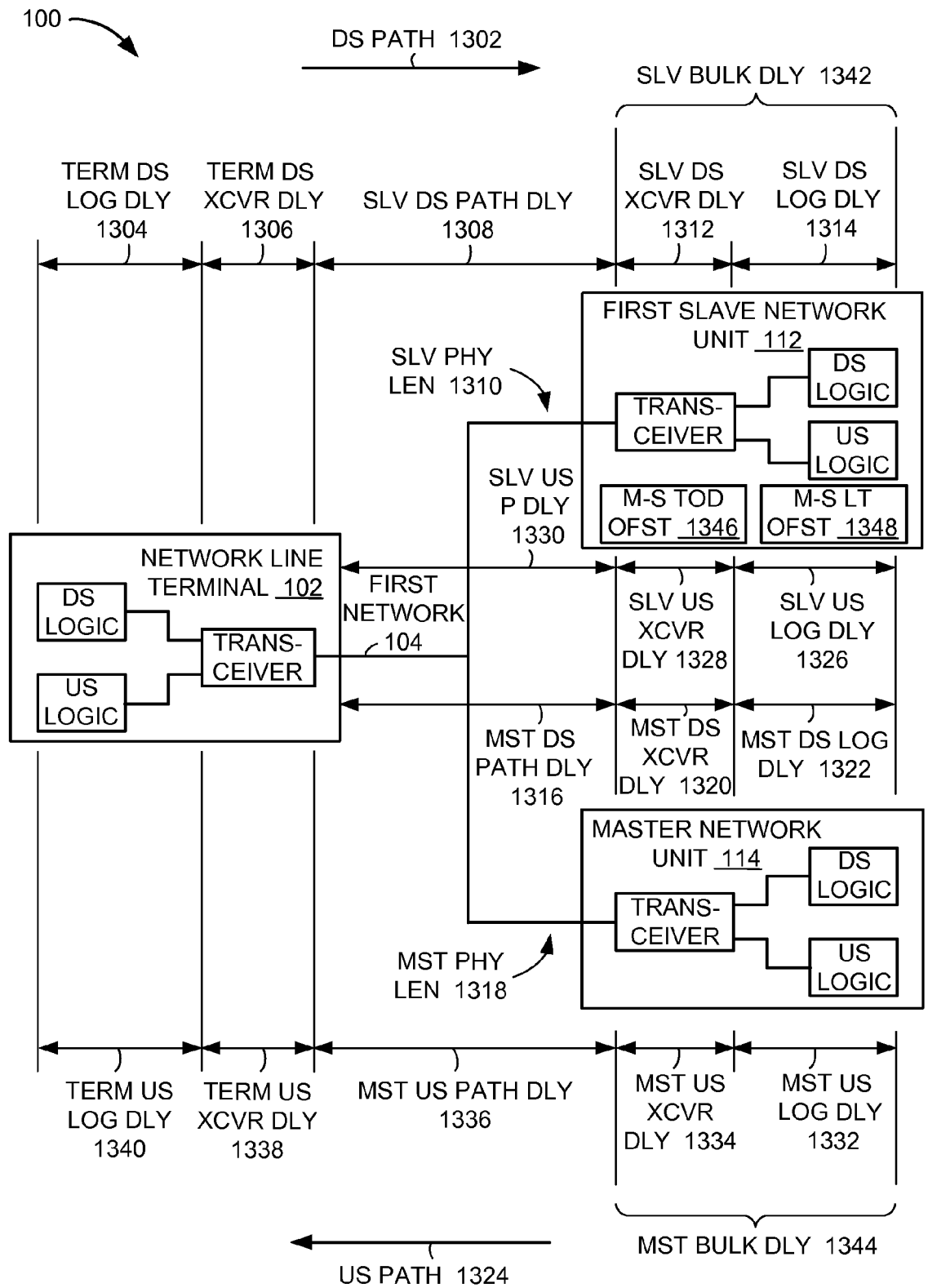
FIG. 13 is a block diagram of a portion of the network system in a round trip transit delay calculation process.

Referring now to FIG. 13, therein is shown a block diagram of a portion of the network system 100 in a round trip transit delay calculation process. For any network unit connected to the network line terminal 102, a measured round trip time, designated as RTT, can be calculated as a summation of timing components or parameters.

For example, with the measured round trip time, optical fiber refractive indices, an upstream optical wavelength, and a downstream optical wavelength, a physical distance along a fiber between the network line terminal 102 and network units can be calculated. Also for example, with the physical distance, an upstream time delay (UST) and a downstream time delay (DST) can be calculated using RTT=DST+UST.

The slave round trip time 208 of FIG. 2 can be calculated based on the slave downstream delay 302 of FIG. 3 (T_SLV_DS) and the slave upstream delay 304 of FIG. 3 (T_SLV_US). The slave round trip time 208 can be calculated with an addition of the slave downstream delay 302 and the slave upstream delay 304. The slave round trip time 208, designated as SLV_RTT, can be calculated with Equation 23 below:

$$SLV\_RTT = T\_SLV\_DS + T\_SLV\_US \quad (23)$$

The master round trip time 802 can be calculated based on the master downstream delay 804 (T_MST_DS) and the master upstream delay 806 (T_MST_US). The master round trip time 802 can be calculated with an addition of the master downstream delay 804 and the master upstream delay 806. The master round trip time 802, designated as MST_RTT, can be calculated with Equation 24 below:

$$MST\_RTT = T\_MST\_DS + T\_MST\_US \quad (24)$$

For illustrative purposes, the network line terminal 102, the first slave network unit 112, and the master network unit 114 are partially shown as each having an upstream logic, a downstream logic, and a transceiver having a transmitter and a receiver. The network line terminal 102 is shown connected to the first slave network unit 112 and the master network unit 114 via the first network 104. For example, the transceiver can be an optical transceiver.

Also for illustrative purposes, the network system 100 is shown to include the first slave network unit 112 for purposes of calculating the slave round trip time 208 of FIG. 2, although any other network units can be included for purposes of calculating its round trip time. For example, the second slave network unit 116 of FIG. 1, the first network unit 106 of FIG. 1, the second network unit 108 of FIG. 1, or the nth network unit 110 of FIG. 1 can be included.

The network system 100 can include a downstream path 1302, more particularly the first network 104 from the network line terminal 102 to the network units. In the downstream path 1302, the network system 100 can include the network line terminal 102 having a terminal downstream logic delay 1304, designated as T_NLT_tx_logic and more specifically a timing component that includes intrinsic delays of logic components (e.g. gates, cells, etc.) and interconnect delays between the downstream logic and the transceiver of the network line terminal 102. The network line terminal 102 can also have a terminal downstream transceiver delay 1306, designated as T_NLT_tx_xcvr and more specifically a timing component that includes propagation delays in the transmitter of the network line terminal 102.

In the downstream path 1302 to the first slave network unit 112, the network system 100 can include a slave downstream path delay 1308, designated as T_SLV_DS_Path and more specifically a timing component that includes propagation delays in the first network 104 from the transceiver of the network line terminal 102 to the transceiver of the first slave network unit 112. For example, the slave downstream path delay 1308 can be a fiber plant downstream delay.

The slave downstream path delay 1308 can be calculated based on a downstream index of refraction, designated as η[λ_ds], of a medium used in the first network 104 at a downstream wavelength, where η designates an index of refraction and λ_ds designates the downstream wavelength. The downstream index of refraction (η[λ_ds]) is more specifically a ratio of a velocity of a light (i.e. an electromagnetic radiation) in a vacuum to another velocity of the light in the medium in the downstream path 1302. For example, the downstream index of refraction can be a known physical constant or a refractive index of the medium, such as an optical fiber, that is used in the first network 104.

The slave downstream path delay 1308 can be calculated based on a slave physical length 1310, designated as SLV_Length and more specifically a length of a medium used in the first network 104 between the network line terminal 102 and the first slave network unit 112. The slave downstream path delay 1308 can be calculated based on the speed of light, designated as c and more specifically a known physical constant or a speed at which light travels in vacuum.

The slave downstream path delay 1308 can be calculated with a product of the downstream index of refraction and the slave physical length 1310 divided by the speed of light. The slave downstream path delay 1308 can be calculated with Equation 25 below:

$$T\_SLV\_DS\_Path = \eta[\lambda\_ds] * SLV\_Length/c \qquad (25)$$

In the downstream path 1302, the network system 100 can include the first slave network unit 112 having a slave downstream transceiver delay 1312, designated as T_SLV_RX_Xcvr and more specifically a timing component that includes propagation delays in the receiver of the first slave network unit 112. The first slave network unit 112 can also have a slave downstream logic delay 1314, designated as T_SLV_RX_Logic and more specifically a timing component that includes intrinsic delays of logic components (e.g. gates, cells, etc.) and interconnect delays between the downstream logic and the transceiver of the first slave network unit 112.

In the downstream path 1302 to the master network unit 114, the network system 100 can include a master downstream path delay 1316, designated as T_MST_DS_Path and more specifically a timing component that includes propagation delays in the first network 104 from the transceiver of the network line terminal 102 to the transceiver of the master network unit 114. For example, the master downstream path delay 1316 can be a fiber plant downstream delay. The master downstream path delay 1316 can be calculated based on the downstream index of refraction, designated as η[λ_ds].

The master downstream path delay 1316 can be calculated based on a master physical length 1318, designated as MST_Length and more specifically a length of a medium used in the first network 104 between the network line terminal 102 and the master network unit 114. The master downstream path delay 1316 can be calculated based on the speed of light, designated as c and more specifically a known physical constant or a speed at which light travels in vacuum.

The master downstream path delay 1316 can be calculated with a product of the downstream index of refraction and the master physical length 1318 divided by the speed of light. The master downstream path delay 1316 can be calculated with Equation 26 below:

$$T\_MST\_DS\_Path = \eta[\lambda\_ds] * MST\_Length/c \qquad (26)$$

In the downstream path 1302, the network system 100 can include the master network unit 114 having a master downstream transceiver delay 1320, designated as T_MST_RX_Xcvr and more specifically a timing component that includes propagation delays in the receiver of the master network unit 114. The master network unit 114 can also have a master downstream logic delay 1322, designated as T_MST_RX_Logic and more specifically a timing component that includes intrinsic delays of logic components (e.g. gates, cells, etc.) and interconnect delays between the downstream logic and the transceiver of the master network unit 114.

The network system 100 can include an upstream path 1324, more particularly the first network 104 from the network units to the network line terminal 102. In the upstream path 1324, the network system 100 can include the first slave network unit 112 having a slave upstream logic delay 1326, designated as T_SLV_TX_Logic and more specifically a timing component that includes intrinsic delays of logic components (e.g. gates, cells, etc.) and interconnect delays between the upstream logic and the transceiver of the first slave network unit 112. The first slave network unit 112 can also have a slave upstream transceiver delay 1328, designated as T_SLV_TX_Xcvr and more specifically a timing component that includes propagation delays in the transmitter of the first slave network unit 112.

In the upstream path 1324 from the first slave network unit 112, the network system 100 can include a slave upstream path delay 1330, designated as T_SLV_US_Path and more specifically a timing component that includes propagation delays in the first network 104 from the transceiver of the first slave network unit 112 to the transceiver of the network line terminal 102. For example, the slave upstream path delay 1330 can be a fiber plant upstream delay.

The slave upstream path delay 1330 can be calculated based on an upstream index of refraction, designated as η[λ_us], of a medium used in the first network 104 at an upstream wavelength, where η designates an index of refraction and λ_us designates the upstream wavelength. The upstream index of refraction (η[λ_us]) is more specifically a ratio of a velocity of a light (i.e. an electromagnetic radiation) in a vacuum to another velocity of the light in the medium in the upstream path 1324. For example, the upstream index of refraction can be a known physical constant or a refractive index of the medium, such as an optical fiber, that is used in the first network 104.

The slave upstream path delay 1330 can be calculated based on the slave physical length 1310, designated as SLV_Length. The slave upstream path delay 1330 can be calculated based on the speed of light, designated as c and more specifically a known physical constant or a speed at which light travels in vacuum.

The slave upstream path delay 1330 can be calculated with a product of the upstream index of refraction and the slave physical length 1310 divided by the speed of light. The slave upstream path delay 1330, designated as T_SLV_US_Path, can be calculated with Equation 27 below:

$$T\_SLV\_US\_Path = \eta[\lambda\_us] * SLV\_Length/c \qquad (27)$$

In the upstream path 1324 from the master network unit 114, the network system 100 can include the master network unit 114 having a master upstream logic delay 1332, designated as T_MST_TX_Logic and more specifically a timing component that includes intrinsic delays of logic components (e.g. gates, cells, etc.) and interconnect delays between the upstream logic and the transceiver of the master network unit 114. The master network unit 114 can also have a master upstream transceiver delay 1334, designated as T_MST_TX_Xcvr and more specifically a timing component that includes propagation delays in the transmitter of the master network unit 114.

In the upstream path 1324, the network system 100 can include a master upstream path delay 1336, designated as T_MST_US_Path and more specifically a timing component that includes propagation delays in the first network 104 from the transceiver of the master network unit 114 to the transceiver of the network line terminal 102. For example, the master upstream path delay 1336 can be a fiber plant upstream delay. The master upstream path delay 1336 can be calculated based on the upstream index of refraction, designated as η[λ_us].

The master upstream path delay 1336 can be calculated based on the master physical length 1318, designated as MST_Length. The master upstream path delay 1336 can be calculated based on the speed of light, designated as c and more specifically a known physical constant or a speed at which light travels in vacuum.

The master upstream path delay 1336 can be calculated with a product of the upstream index of refraction and the master physical length 1318 divided by the speed of light. The master upstream path delay 1336, designated as T_MST_US_Path, can be calculated with Equation 28 below:

$$T\_MST\_US\_Path = \eta[\lambda\_us] * MST\_Length/c \quad (28)$$

In the upstream path 1324, the network system 100 can include the network line terminal 102 having a terminal upstream transceiver delay 1338, designated as T_NLT_RX_Xcvr and more specifically a timing component that includes propagation delays in the receiver of the network line terminal 102. The network line terminal 102 can also have a terminal upstream logic delay 1340, designated as T_NLT_RX_Logic and more specifically a timing component that includes intrinsic delays of logic components (e.g. gates, cells, etc.) and interconnect delays between the upstream logic and the transceiver of the network line terminal 102.

The first slave network unit 112 can have the slave downstream delay 302. The slave downstream delay 302 can be calculated based on the terminal downstream logic delay 1304 (T_NLT_TX_Logic), the terminal downstream transceiver delay 1306 (T_NLT_TX_Xcvr), the slave downstream path delay 1308 (T_SLV_DS_Path), the slave downstream transceiver delay 1312 (T_SLV_RX_Xcvr), and the slave downstream logic delay 1314 (T_SLV_RX_Logic).

The slave downstream delay 302 can be calculated with an addition of the terminal downstream logic delay 1304, the terminal downstream transceiver delay 1306, the slave downstream path delay 1308, the slave downstream transceiver delay 1312, and the slave downstream logic delay 1314. The slave downstream delay 302, designated as T_SLV_DS, can be calculated with Equation 29 below:

$$T\_SLV\_DS = T\_NLT\_TX\_Logic + T\_NLT\_TX\_Xcvr + T\_SLV\_DS\_Path + T\_SLV\_RX\_Xcvr + T\_SLV\_RX\_Logic \quad (29)$$

The first slave network unit 112 can have the slave upstream delay 304. The slave upstream delay 304 can be calculated based on the slave upstream logic delay 1326 (T_SLV_TX_Logic), the slave upstream transceiver delay 1328 (T_SLV_TX_Xcvr), the slave upstream path delay 1330 (T_SLV_US_Path), the terminal upstream transceiver delay 1338 (T_NLT_RX_Xcvr), and the terminal upstream logic delay 1340 (T_NLT_RX_Logic).

The slave upstream delay 304 can be calculated with an addition of the slave upstream logic delay 1326, the slave upstream transceiver delay 1328, the slave upstream path delay 1330, the terminal upstream transceiver delay 1338, and the terminal upstream logic delay 1340. The slave upstream delay 304, designated as T_SLV_US, can be calculated with Equation 30 below:

$$T\_SLV\_US = T\_SLV\_TX\_Logic + T\_SLV\_TX\_Xcvr + T\_SLV\_US\_Path + T\_NLT\_RX\_Xcvr + T\_NLT\_RX\_Logic \quad (30)$$

After the slave downstream delay 302 and the slave upstream delay 304 in the Equation 23 are substituted with the Equations 29 and 30, respectively, the slave round trip time 208 can be calculated with an addition of the terminal downstream logic delay 1304, the terminal downstream transceiver delay 1306, the slave downstream path delay 1308, the slave downstream transceiver delay 1312, the slave downstream logic delay 1314, the slave upstream logic delay 1326, the slave upstream transceiver delay 1328, the slave upstream path delay 1330, the terminal upstream transceiver delay 1338, and the terminal upstream logic delay 1340. The slave round trip time 208 can be calculated with Equation 31 below:

$$SLV\_RTT = T\_NLT\_TX\_Logic + T\_NLT\_TX\_Xcvr + T\_SLV\_DS\_Path + T\_SLV\_RX\_Xcvr + T\_SLV\_RX\_Logic + T\_SLV\_TX\_Logic + T\_SLV\_TX\_Xcvr + T\_SLV\_US\_Path + T\_NLT\_RX\_Xcvr + T\_NLT\_RX\_Logic \quad (31)$$

The master network unit 114 can have the master downstream delay 804, designated as T_MST_DS. The slave downstream delay 302 can be calculated based on the terminal downstream logic delay 1304 (T_NLT_TX_Logic), the terminal downstream transceiver delay 1306 (T_NLT_TX_Xcvr), the master downstream path delay 1316 (T_MST_DS_Path), the master downstream transceiver delay 1320 (T_MST_RX_Xcvr), and the master downstream logic delay 1322 (T_MST_RX_Logic).

The master downstream delay 804 can be calculated with an addition of the terminal downstream logic delay 1304, the terminal downstream transceiver delay 1306, the master downstream path delay 1316, the master downstream transceiver delay 1320, and the master downstream logic delay 1322. The master downstream delay 804 can be calculated with Equation 32 below:

$$T\_MST\_DS = T\_NLT\_TX\_Logic + T\_NLT\_TX\_Xcvr + T\_MST\_DS\_Path + T\_MST\_RX\_Xcvr + T\_MST\_RX\_Logic \quad (32)$$

The master network unit 114 can have the master upstream delay 806. The master upstream delay 806 can be calculated based on the master upstream logic delay 1332 (T_MST_TX_Logic), the master upstream transceiver delay 1334 (T_MST_TX_Xcvr), the master upstream path delay 1336 (T_MST_US_Path), the terminal upstream transceiver delay 1338 (T_NLT_RX_Xcvr), and the terminal upstream logic delay 1340 (T_NLT_RX_Logic).

The master upstream delay 806 can be calculated with an addition of the master upstream logic delay 1332, the master upstream transceiver delay 1334, the master upstream path delay 1336, the terminal upstream transceiver delay 1338, and the terminal upstream logic delay 1340. The master upstream delay 806, designated as T_MST_US, can be calculated with Equation 33 below:

$$T\_MST\_US = T\_MST\_TX\_Logic + T\_MST\_TX\_Xcvr + T\_MST\_US\_Path + T\_NLT\_RX\_Xcvr + T\_NLT\_RX\_Logic \quad (33)$$

After the master downstream delay 804 and the master upstream delay 806 in the Equation 24 are substituted with the Equations 31 and 32, respectively, the master round trip time 802 can be calculated with an addition of the terminal downstream logic delay 1304, the terminal downstream transceiver delay 1306, the master downstream path delay 1316, the master downstream transceiver delay 1320, the master downstream logic delay 1322, the master upstream logic delay 1332, the master upstream transceiver delay 1334, the master upstream path delay 1336, the terminal upstream transceiver delay 1338, and the terminal upstream logic delay 1340. The master round trip time 802 can be calculated with Equation 34 below:

$$MST\_RTT = T\_NLT\_TX\_Logic + T\_NLT\_TX\_Xcvr + T\_MST\_DS\_Path + T\_MST\_RX\_Xcvr + T\_MST\_RX\_Logic + T\_MST\_TX\_Logic + T\_MST\_TX\_Xcvr + T\_MST\_US\_Path + T\_NLT\_RX\_Xcvr + T\_NLT\_RX\_Logic \quad (34)$$

Expressions of the slave round trip time 208 and the master round trip time 802 of FIG. 8 can be simplified. The expressions can be simplified by adding logic and transceiver delays of the first slave network unit 112 and the master network unit 114 to get bulk delays. For example, the bulk delays can be calibrated delay characteristic values of the first slave network unit 112 and the master network unit 114.

The first slave network unit 112 and the master network unit 114 can be calibrated. Calibration is defined as a process including the ranging process that can be used to determine round trip times of the network units, including the slave round trip time 208 and the master round trip time 802. The slave round trip time 208 and the master round trip time 802 can be determined by calculating delays between the network line terminal 102 and the first slave network unit 112 and between the network line terminal 102 and the master network unit 114, respectively. The slave round trip time 208 and the master round trip time 802 can be calculated by the network line terminal 102.

The first slave network unit 112 can have a slave bulk delay 1342, designated as T_SLV and more specifically a timing component that is a sum of the slave downstream transceiver delay 1312, the slave downstream logic delay 1314, the slave upstream logic delay 1326, and the slave upstream transceiver delay 1328. The slave bulk delay 1342 can be calculated with Equation 35 below:

$$T\_SLV = T\_SLV\_RX\_Xcvr + T\_SLV\_RX\_Logic + T\_SLV\_TX\_Logic + T\_SLV\_TX\_Xcvr \quad (35)$$

The master network unit 114 can have a master bulk delay 1344, designated as T_MST and more specifically a timing component that is a sum of the master downstream transceiver delay 1320, the master downstream logic delay 1322, the master upstream logic delay 1332, and the master upstream transceiver delay 1334. The master bulk delay 1344 can be calculated with Equation 36 below:

$$T\_MST = T\_MST\_RX\_Xcvr + T\_MST\_RX\_Logic + T\_MST\_TX\_Logic + T\_MST\_TX\_Xcvr \quad (36)$$

When a difference of the master round trip time 802, designated as MST_RTT, and the slave round trip time 208, designated as SLV_RTT is evaluated, terms in equations that are related to the timing components in the network line terminal 102 can be cancelled. Since the terms can be cancelled, the difference can be calculated with a first difference of the master bulk delay 1344 and the slave bulk delay 1342, a second difference of the master physical length 1318 and the slave physical length 1310, a first addition of the downstream index of refraction and the upstream index of refraction, a product of the second difference and the first addition divided by the speed of light, and a second addition of the first difference and the product. The difference, designated as MST_RTT−SLV_RTT, can be calculated with Equation 37 below:

$$MST\_RTT - SLV\_RTT = T\_MST - T\_SLV + (MST\_Length - SLV\_Length)*(\eta[\lambda\_ds] + \eta[\lambda\_ds])/c \quad (37)$$

Next, terms in the equation above can be re-arranged and a length difference, between the master physical length 1318 and the slave physical length 1310, can be solved. The length difference can be solved based on the master round trip time 802, the slave round trip time 208, the calibrated delay characteristic values, and the known physical constants.

The length difference can be calculated with a quantity of the master round trip time 802 subtracted by the slave round trip time 208 subtracted by the master bulk delay 1344 added by the slave bulk delay 1342, an addition of the downstream index of refraction and the upstream index of refraction, a quotient of the speed of light and the addition, and a product of the quantity and the quotient. The length difference, designated as MST_Length−SLV_Length, can be calculated with Equation 38 below:

$$(MST\_Length - SLV\_Length) = (MST\_RTT - SLV\_RTT - T\_MST + T\_SLV)*c/(\eta[\lambda\_ds] + \eta[\lambda\_us]) \quad (38)$$

To align time of day (ToD) events at the first slave network unit 112 and the master network unit 114, the time offset at the first slave network unit 112 can be calculated as a time difference in downstream delays from the network line terminal 102 to the first slave network unit 112 and the master network unit 114. A difference of downstream latencies between the master network unit 114 and the first slave network unit 112 can be calculated.

The difference can be calculated by splitting the slave bulk delay 1342 and the master bulk delay 1344 into their constituent upstream and downstream components. The constituent downstream components of the slave bulk delay 1342 are the slave downstream transceiver delay 1312 and the slave downstream logic delay 1314. The constituent downstream components of the master bulk delay 1344 are the master downstream transceiver delay 1320 and the master downstream logic delay 1322.

A master-slave time of day offset 1346, designated as MST_SLV_ToD_Offset and more specifically a time difference between the master time of day 812 of FIG. 8 and the slave time of day 216 of FIG. 2, can be calculated. The master-slave time of day offset 1346 can be calculated with a first difference of the master physical length 1318 and the slave physical length 1310, a product of the downstream index of refraction and the first difference, a second difference of the master downstream delay 804 and the slave downstream delay 302, and an addition of the product and the second difference. The master-slave time of day offset 1346 can be calculated with Equation 39 below:

$$MST\_SLV\_ToD\_Offset = \eta[\lambda\_ds]*(MST\_Length - SLV\_Length) + (T\_MST\_DS - T\_SLV\_DS) \quad (39)$$

The slave time of day 216 can be calculated based on the master time of day 812, designated as MST_ToD, and the master-slave time of day offset 1346. The slave time of day 216 can be calculated with an addition of the master time of day 812 and the master-slave time of day offset 1346. The slave time of day 216, designated as SLV_ToD, can be calculated with Equation 40 below:

$$SLV\_ToD = MST\_ToD + MST\_SLV\_ToD\_Offset \quad (40)$$

A master-slave local time offset 1348, designated as MST_SLV_LT_Offset and more specifically a time difference between the master local time 814 of FIG. 8 of the master network unit 114 and the slave local time 218 of FIG. 2 of the first slave network unit 112, can be calculated. The master-slave local time offset 1348 can be calculated based on the master-slave time of day offset 1346 and the slave timebase interval 308 of FIG. 3, designated as SLV_Ticks/s.

The master-slave local time offset 1348 can be calculated with a product of the master-slave time of day offset 1346 and the slave timebase interval 308. The master-slave local time offset 1348 can be calculated with Equation 41 below:

$$MST\_SLV\_LT\_Offset = MST\_SLV\_ToD\_Offset * SLV\_Ticks/s \quad (41)$$

The slave local time 218 can be calculated based on the master local time 814, designated as MST_LT, and the master-slave local time offset 1348. The slave local time 218 can be calculated with an addition of the master local time 814 and the master-slave local time offset 1348. The slave local time 218, designated as SLV_LT, can be calculated with Equation 42 below:

$$SLV\_LT = MST\_LT + MST\_SLV\_LT\_Offset \quad (42)$$

Thus, it can be proven that without knowing any specific timing components in the network line terminal 102, the network units can be introduced to or included and synchronized in the network system 100. In other words, the time of day (ToD) synchronization can be achieved by having the network units synchronized in the network system 100 with the timing components of the master network unit 114. The network units can be calibrated network units, such as the first slave network unit 112, for which the ranging process can be performed.

The master time of day 812 can be determined based on the terminal time of day 202 of FIG. 2 (NLT_ToD) and the master downstream delay 804 (T_MST_DS). The master time of day 812 can be calculated with a difference of the terminal time of day 202 and the master downstream delay 804. The master time of day 812, designated as MST_ToD, can be calculated with Equation 43 below:

$$MST\_ToD = NLT\_ToD - T\_MST\_DS \quad (43)$$

With the master network unit 114 functioning as the master that provides the time and the network line terminal 102 synchronizing to the time provided by the master network unit 114, the terminal time of day 202 can be calculated based on the master time of day 812 and the master downstream delay 804. The network line terminal 102 can calculate the terminal time of day 202 with an addition of the master time of day 812 and the master downstream delay 804. The terminal time of day 202, designated as NLT_ToD, with Equation 44 below:

$$NLT\_ToD = MST\_ToD + T\_MST\_DS \quad (44)$$

For example, the slave control unit 428 of FIG. 4 can calculate the master-slave time of day offset 1346. Also for example, the slave control unit 428 can calculate the master-slave local time offset 1348.

For illustrative purposes, the round trip transit delay calculation process includes a configuration having just the master network unit 114, although there can be a plurality of the master network unit 114. For example, the network system 100 can include the master network unit 114 as a timing master and another of the master network unit 114 connected to the network line terminal 102 as another timing master for redundancy. Multiple timing masters can be provided in the network system 100 to provide redundancy or failover to avoid a single point of failure.

Figure 14:
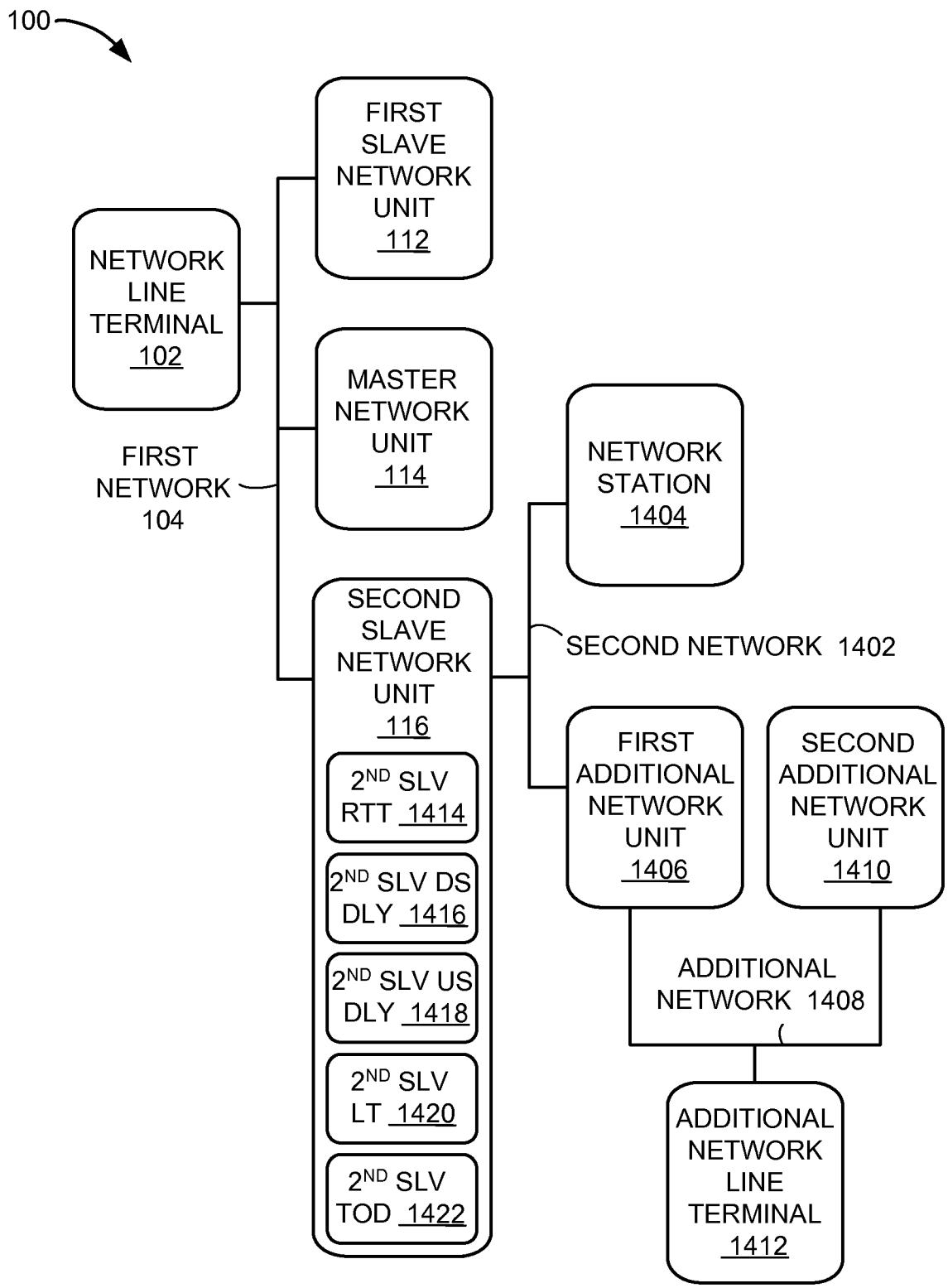
FIG. 14 is a system diagram with an additional portion of the network system.

Referring now to FIG. 14, therein is shown a system diagram with an additional portion of the network system 100. The additional portion is shown to include the second slave network unit 116 connected to a second network 1402, more specifically a wired network, a wireless network, or a combination thereof. The first network 104 and the second network 1402 can be on the same network topology or a different network topology.

For example, the second network 1402 can include copper wires. Also for example, the second network 1402 can be within buildings or across clusters of buildings.

The second slave network unit 116 can be connected to a network station 1404, more specifically a base station, via the second network 1402. For example, the network station 1404 can be a femtocell, a cellular base station, a home base station, or an access point. A plurality of the network station 1404 can be connected to the second network 1402.

A first additional network unit 1406, more specifically a device or a station that can distribute network information from a higher speed network connection to multiple lower speed network connections, can be connected to the second network 1402. For example, the first additional network unit 1406 can be an optical network unit (ONU), an optical network terminal (ONT), a multi-dwelling unit (MDU), a single-family unit (SFU), a multi-tenant unit (MTU), or a cellular backhaul unit (CBU).

The first additional network unit 1406 can be connected to an additional network 1408, more specifically a fiber optic cable, an optical connection, a splitter, or a combination thereof. For example, the additional network 1408 can include passive optical network (PON) optics.

A second additional network unit 1410, more specifically a device or a station that can distribute network information from a higher speed network connection to multiple lower speed network connections, can be connected to the additional network 1408. For example, the second additional network unit 1410 can be an optical network unit (ONU), an optical network terminal (ONT), or a multi-dwelling unit (MDU).

An additional network line terminal 1412, more particularly a network device that connects a high speed network link to multiple devices operating at a lower speed, can be connected to the additional network 1408. The additional network line terminal 1412 can be located at a service provider's central office (CO).

The ranging process can be performed by the network line terminal 102 to determine a second slave round trip time 1414, more specifically a sum of delays of downstream and upstream paths between the network line terminal 102 and the second slave network unit 116. The second slave round trip time 1414 can be determined based on a second slave downstream delay 1416 and a second slave upstream delay 1418.

The second slave downstream delay 1416 is more specifically a time delay from the network line terminal 102 to the second slave network unit 116. The second slave upstream delay 1418 is more specifically a time delay from the second slave network unit 116 to the network line terminal 102. The second slave downstream delay 1416 and the second slave upstream delay 1418 can be calculated in a manner similar to the slave downstream delay 302 of FIG. 3 and the slave upstream delay 304 of FIG. 3, respectively, except that some of the timing components used in the calculation are related to the second slave network unit 116 instead of the first slave network unit 112.

The second slave network unit 116 can achieve the time of day (ToD) synchronization with the master network unit 114 functioning as the timing master. The master network unit 114 can send the master message 1202 of FIG. 12 to the second slave network unit 116. The master message 1202 can include the master time of day 812 of FIG. 8, the master local time 814 of FIG. 8, and the master round trip time 802 of FIG. 8, including the master downstream delay 804 of FIG. 8 and the master upstream delay 806 of FIG. 8.

With the master local time 814 (MST_LT), the master downstream delay 804 (T_MST_DS), and the second slave downstream delay 1416 (T_SLV_DS_2), the second slave network unit 116 can calculate a second slave local time 1420, more specifically a time in ticks at the second slave network unit 116. The second slave local time 1420 can be calculated with the master local time 814 added by the master downstream delay 804 subtracted by the second slave downstream delay 1416. The second slave local time 1420, designated as SLV_LT_2, can be calculated with Equation 45 below:

$$SLV\_LT\_2 = MST\_LT + T\_MST\_DS - T\_SLV\_DS\_2 \quad (45)$$

With the master time of day 812 (MST_ToD), the master downstream delay 804 (T_MST_DS), and the second slave downstream delay 1416 (T_SLV_DS_2), the second slave network unit 116 can calculate a second slave time of day 1422, more specifically more specifically a time of day at the second slave network unit 116. The second slave time of day 1422 can be calculated with the master time of day 812 added by the master downstream delay 804 subtracted by the second slave downstream delay 1416. The second slave time of day 1422, designated as SLV_ToD 2, can be calculated with Equation 46 below:

$$SLV\_ToD\_2 = MST\_ToD + T\_MST\_DS - T\_SLV\_DS\_2 \quad (46)$$

For example, the second slave network unit 116 can function as a timing source to provide time to the first additional network unit 1406 that synchronizes to the time provided by the second slave network unit 116. Also for example, the second slave network unit 116 can function as an IEEE-1588 master, which is a provider of time, to the first additional network unit 1406.

The second slave network unit 116 can send second slave time messages including the second slave local time 1420, the second slave time of day 1422, the second slave round trip time 1414, the second slave downstream delay 1416, the second slave upstream delay 1418, or a combination thereof. The second slave time messages of the second slave network unit 116 can be sent to the first additional network unit 1406.

The second slave time messages can then be sent from the first additional network unit 1406 through the additional network line terminal 1412 to the second additional network unit 1410 to achieve the time of day (ToD) synchronization. The second slave time messages can be sent through the additional network line terminal 1412 by having the additional network line terminal 1412 relaying or disseminating the second slave time messages to the second additional network unit 1410 over the additional network 1408.

It has been discovered that the network system 100 provides the Time of Day (ToD) synchronization from a network unit functioning as the master network unit 114. The time of day (ToD) synchronization is provided by having the master network unit 114 functioning as a timing master in the network system 100. The master network unit 114 sends (by unicast or broadcast) the master message 1202 to the network units, including the first slave network unit 112. The master message 1202 includes the master time of day 812 and the master local time 814. The master message 1202 also includes the master round trip time 802, including the master downstream delay 804 and the master upstream delay 806. With the first slave network unit 112 calibrated, the first slave network unit 112 computes the slave local time 218 based on the master downstream delay 804, the master time of day 812, the master local time 814, the slave downstream delay 302, or a combination thereof. With the slave local time 218 computed, the first slave network unit 112 is in phase with the master network unit 114, thereby achieving the time of day (ToD) synchronization without forklifting installation of or changing the hardware of the network line terminal 102.

It has also been discovered that the network system 100 improves availability. The master network unit 114 provides incremental synchronization upgrades to the network system 100 without disruption of services. The network system 100 also include timing redundancy by having a plurality of the time source 902, such as multiple timing sources or access points, with the time source 902 having the time event 810, or another of the master network unit 114 to prevent issues related to single point of failure. Without the disruption of services and with the timing redundancy, the availability is improved.

It has further been discovered that the network system 100 achieves a single uni-directional message communication. The first slave network unit 112 receives the master message 1202 from the master network unit 114. The first slave network unit 112 calculates the slave local time 218 based on the master message 1202 without having to respond to the master network unit 114, thereby the single uni-directional message communication is achieved.

It has yet further been discovered that the network system 100 achieves time synchronization between the master network unit 114 and the first slave network unit 112 without a timing term for the network line terminal 102. With the master local time 814, the master downstream delay 804, and the slave downstream delay 302. The first slave network unit 112 is able to calculate the slave local time 218 without having any specific timing components in the network line terminal 102, thereby achieving the time synchronization without the timing term for the network line terminal 102.

It has yet further been discovered that the network system 100 achieves time synchronization across multiple networks. The master message 1202 is sent from the master network unit 114 to the second slave network unit 116 over the first network 104. The second slave network unit 116 calculates the second slave local time 1420 based on the master message 1202. The second slave local time 1420 is then sent to the first additional network unit 1406 over the second network 1402 and through the additional network line terminal 1412 to the second additional network unit 1410 over the additional network 1408, thereby achieving the time synchronization across multiple networks.

Thus, it has been discovered that the network system 100 of the present invention furnishes important and heretofore unknown and unavailable solutions, capabilities, and functional aspects for providing synchronization.

Figure 15:
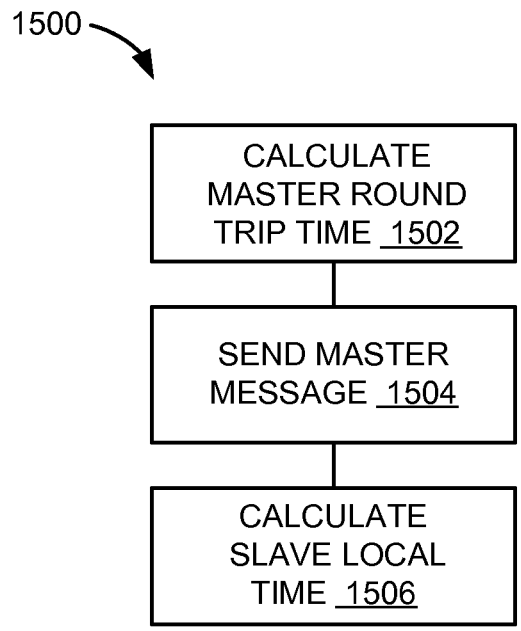
FIG. 15 is a flow chart of a method of operation of the network system in a further embodiment of the present invention.

Referring now to FIG. 15, therein is shown a flow chart of a method 1500 of operation of the network system 100 in a further embodiment of the present invention. The method 1500 includes: calculating a master round trip time between the network line terminal and the master network unit in a block 1502; sending a master message to the slave network unit, the master message having the master round trip time and a master local time in a block 1504; and calculating a slave local time based on the master round trip time and the master local time in a block 1506.

Figure 16:
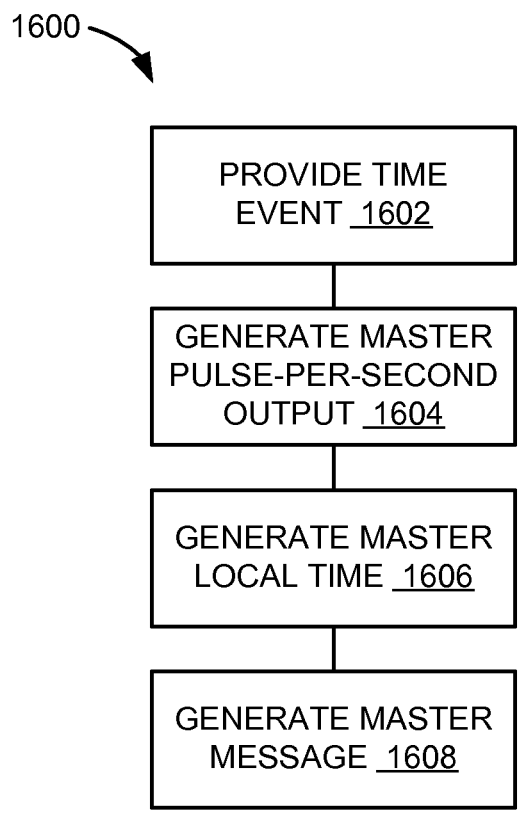
FIG. 16 is a flow chart of a method of operation of the network system in a yet further embodiment of the present invention.

Referring now to FIG. 16, therein is shown a flow chart of a method 1600 of operation of the network system 100 in a yet further embodiment of the present invention. The method 1600 includes: providing a time event in a block 1602; generating a master pulse-per-second output based on the time event in a block 1604; generating a master local time based on the master pulse-per-second output in a block 1606; and generating a master message with the master local time in a block 1608.

Figure 17:
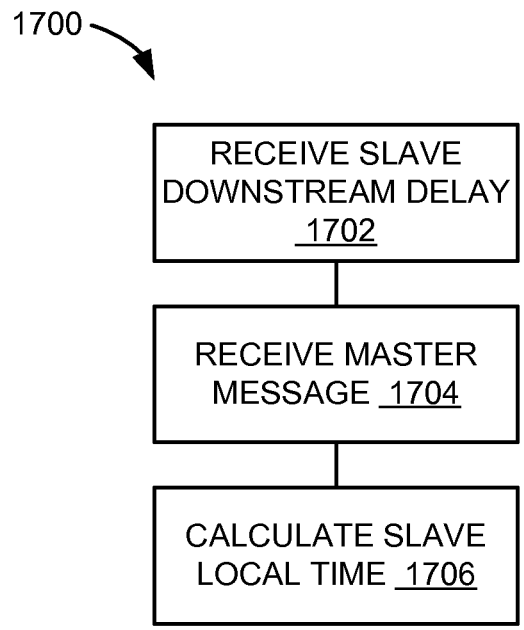
FIG. 17 is a flow chart of a method of operation of the network system in a yet further embodiment of the present invention.

Referring now to FIG. 17, therein is shown a flow chart of a method 1700 of operation of the network system 100 in a yet further embodiment of the present invention. The method 1700 includes: receiving a slave downstream delay in a block 1702; receiving a master message having a master time of day, a master local time, and a master downstream delay in a block 1704; and calculating a slave local time based on the master message and the slave downstream delay in a block 1706.

Figure 18:
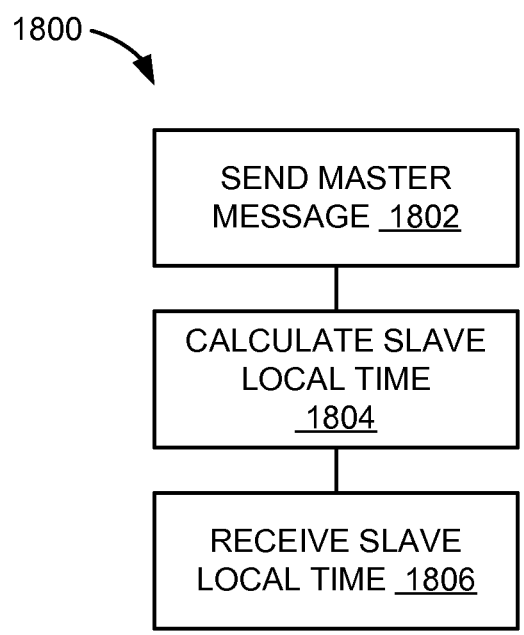
FIG. 18 is a flow chart of a method of operation of the network system in a yet further embodiment of the present invention.

Referring now to FIG. 18, therein is shown a flow chart of a method 1800 of operation of the network system 100 in a yet further embodiment of the present invention. The method 1800 includes: sending a master message from the master network unit to the slave network unit in a block 1802; calculating a slave local time based on the master message with the slave network unit in a block 1804; and receiving the slave local time with the first additional network unit in a block 1806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a network system including a network line terminal coupled to a slave network unit and a master network unit over a first network comprising:
   calculating a master round trip time between the network line terminal and the master network unit;
   sending a master message to the slave network unit, the master message having the master round trip time and a master local time, the master round trip time is based on a master downstream delay;
   calculating a master-slave time of day offset with a first difference of a master physical length of the first network and a slave physical length of the first network, a product of a downstream index of refraction of the first network and the first difference, a second difference of the master downstream delay and a slave downstream delay, and an addition of the product and the second difference; and
   calculating a slave local time based on the master round trip time and the master local time.

2. The method as claimed in claim 1 further comprising connecting a time source to the master network unit.

3. The method as claimed in claim 1 further comprising connecting a further master network unit to the network line terminal.

4. The method as claimed in claim 1 wherein calculating the slave local time includes synchronizing the slave local time with the master local time without the slave network unit responding to the master message.

5. The method as claimed in claim 1 further comprising:
   calculating a slave round trip time between the network line terminal and the slave network unit; and
wherein:
   calculating the slave local time includes adding the master round trip time divided by two with the master local time and subtracting by the slave round trip time divided by two.

6. The method as claimed in claim 1 wherein sending the master message to the slave network unit includes sending the master message from the master network unit to the network line terminal to the slave network unit.

7. A method of operation of a network system including a network line terminal coupled to a slave network unit and a master network unit over a first network comprising:
   providing a time event;
   generating a master pulse-per-second output based on the time event;
   generating a master local time based on the master pulse-per-second output;
   generating a master message with the master local time and a master downstream delay; and
   calculating a master-slave time of day offset with a first difference of a master physical length of the first network and a slave physical length of the first network, a product of a downstream index of refraction of the first network and the first difference, a second difference of the master downstream delay and a slave downstream delay, and an addition of the product and the second difference.

8. The method as claimed in claim 7 wherein generating the master message includes generating the master message with a master time of day of the master network unit.

9. The method as claimed in claim 7 wherein generating the master message includes generating the master message with a master round trip time.

10. The method as claimed in claim 7 wherein generating the master message includes generating the master message with the master downstream delay from the network line terminal to the master network unit.

11. The method as claimed in claim 7 wherein generating the master local time includes sampling a master local timebase with the time event.

12. The method as claimed in claim 7 further comprising:
   generating a master interrupt request pulse based on the time event; and
   updating a master frequency control value based on the master interrupt request pulse; and
wherein:
   generating the master local time includes generating the master local time based on the master pulse-per-second output controlled by the master frequency control value.

13. A method of operation of a network system including a network line terminal coupled to a slave network unit and a master network unit over a first network comprising:
receiving a slave downstream delay;
receiving a master message having a master time of day, a master local time, and a master downstream delay;
calculating a master-slave time of day offset with a first difference of a master physical length of the first network and a slave physical length of the first network, a product of a downstream index of refraction of the first network and the first difference, a second difference of the master downstream delay and the slave downstream delay, and an addition of the product and the second difference; and
calculating a slave local time based on the master message and the slave downstream delay.

14. The method as claimed in claim 13 wherein calculating the slave local time includes calculating the slave local time based on the master local time, the master downstream delay, and the slave downstream delay.

15. The method as claimed in claim 13 further comprising generating a slave trigger event based on the master message.

16. The method as claimed in claim 13 further comprising generating a slave count value based on the master message.

17. The method as claimed in claim 13 further comprising estimating a slave frequency offset based on the master message.

18. The method as claimed in claim 13 further comprising:
generating a slave interrupt request pulse based on the master message; and
updating a slave frequency control value based on the slave interrupt request pulse; and
wherein:
calculating the slave local time includes calculating the slave local time based on the slave frequency control value.

19. The method as claimed in claim 13 further comprising calculating a slave time of day based on the master time of day added with the master downstream delay and subtracted by the slave downstream delay.

20. The method as claimed in claim 13 further comprising calculating a slave time of day with a second addition of the master time of day and the master-slave time of day offset.

21. The method as claimed in claim 13 further comprising:
calculating a master-slave local time offset between the master network unit and the slave network unit; and
wherein:
calculating the slave local time includes calculating the slave local time with an addition of the master local time and the master-slave local time offset.

22. The method as claimed in claim 13 further comprising calculating a terminal time of day with an addition of the master time of day and the master downstream delay.

23. A method of operation of a network system including a network line terminal coupled to a slave network unit and a master network unit over a first network, an additional network line terminal coupled to a first additional network unit and a second additional network unit over an additional network, and the slave network unit coupled to the first additional network unit over a second network comprising:
sending a master message from the master network unit to the slave network unit, the master message is based on a master downstream delay;
calculating a master-slave time of day offset with a first difference of a master physical length of the first network and a slave physical length of the first network, a product of a downstream index of refraction of the first network and the first difference, a second difference of the master downstream delay and a slave downstream delay, and an addition of the product and the second difference;
calculating a slave local time based on the master message with the slave network unit; and
receiving the slave local time with the first additional network unit.

24. The method as claimed in claim 23 further comprising sending the slave local time through the additional network line terminal to the second additional network unit with the first additional network unit.

25. A network system including a network line terminal coupled to a slave network unit and a master network unit over a first network comprising:
a master calculation unit for calculating a master round trip time between the network line terminal and the master network unit;
a master interface unit for sending a master message to the slave network unit, the master message having the master round trip time and a master local time, the master round trip time is based on a master downstream delay;
a slave control unit for calculating a master-slave time of day offset with a first difference of a master physical length of the first network and a slave physical length of the first network, a product of a downstream index of refraction of the first network and the first difference, a second difference of the master downstream delay and a slave downstream delay, and an addition of the product and the second difference; and
a slave calculation unit for calculating a slave local time based on the master round trip time and the master local time.

26. The system as claimed in claim 25 further comprising a time source connected to the master network unit.

27. The system as claimed in claim 25 further comprising a further master network unit connected to the network line terminal.

28. The system as claimed in claim 25 wherein the slave calculation unit is for synchronizing the slave local time with the master local time without the slave network unit responding to the master message.

29. The system as claimed in claim 25 further comprising:
a slave control unit for calculating a slave round trip time between the network line terminal and the slave network unit; and
wherein:
the slave calculation unit is for calculating the slave local time includes adding the master round trip time divided by two with the master local time and subtracting by the slave round trip time divided by two.

30. The system as claimed in claim 25 wherein the master interface unit is for sending the master message from the master network unit to the network line terminal to the slave network unit.

31. A network system including a network line terminal coupled to a slave network unit and a master network unit over a first network comprising:
a time source for providing a time event;
a master counter for generating a master pulse-per-second output based on the time event;
a master snapshot register for generating a master local time based on the master pulse-per-second output;
a master control unit for generating a master message with the master local time and a master downstream delay; and a slave control unit for calculating a master-slave time of day offset with a first difference of a master physical length of the first network and a slave physical length of the first network, a product of a downstream index of refraction of the first network and the first difference, a second difference of the master downstream delay and a slave downstream delay, and an addition of the product and the second difference.

32. The system as claimed in claim 31 wherein the master control unit is for generating the master message with a master time of day of the master network unit.

33. The system as claimed in claim 31 wherein the master control unit is for generating the master message with a master round trip time.

34. The system as claimed in claim 31 wherein the master control unit is for generating the master message with the master downstream delay from the network line terminal to the master network unit.

35. The system as claimed in claim 31 wherein the master snapshot register is for sampling a master local timebase with the time event.

36. The system as claimed in claim 31 further comprising:
a master interrupt unit for generating a master interrupt request pulse based on the time event; and
wherein:
the master control unit is for updating a master frequency control value based on the master interrupt request pulse; and
the master snapshot register is for generating the master local time based on the master pulse-per-second output controlled by the master frequency control value.

37. A network system including a network line terminal coupled to a slave network unit and a master network unit over a first network comprising:
a slave interface unit for receiving a slave downstream delay;
a slave control unit for;
receiving a master message having a master time of day, a master local time, and a master downstream delay, and
calculating a master-slave time of day offset with a first difference of a master physical length of the first network and a slave physical length of the first network, a product of a downstream index of refraction of the first network and the first difference, a second difference of the master downstream delay and the slave downstream delay, and an addition of the product and the second difference; and
a slave calculation unit for calculating a slave local time based on the master message and the slave downstream delay.

38. The system as claimed in claim 37 wherein the slave calculation unit is for calculating the slave local time based on the master local time, the master downstream delay, and the slave downstream delay.

39. The system as claimed in claim 37 further comprising a slave trigger generator for generating a slave trigger event based on the master message.

40. The system as claimed in claim 37 further comprising a slave counter for generating a slave count value based on the master message.

41. The system as claimed in claim 37 wherein the slave control unit is for estimating a slave frequency offset based on the master message.

42. The system as claimed in claim 37 further comprising:
a slave interrupt unit for generating a slave interrupt request pulse based on the master message; and
wherein:
the slave control unit is for updating a slave frequency control value based on the slave interrupt request pulse; and
the slave calculation unit is for calculating the slave local time includes calculating the slave local time based on the slave frequency control value.

43. The system as claimed in claim 37 wherein the slave calculation unit is for calculating a slave time of day based on the master time of day added with the master downstream delay and subtracted by the slave downstream delay.

44. The system as claimed in claim 37 wherein the slave calculation unit is for calculating a slave time of day with a second addition of the master time of day and the master-slave time of day offset.

45. The system as claimed in claim 37 wherein:
the slave control unit is for calculating a master-slave local time offset between the master network unit and the slave network unit; and
the slave calculation unit is for calculating the slave local time with an addition of the master local time and the master-slave local time offset.

46. The system as claimed in claim 37 wherein the network line terminal is for calculating a terminal time of day with an addition of the master time of day and the master downstream delay.

47. A network system including a network line terminal coupled to a slave network unit and a master network unit over a first network, an additional network line terminal coupled to a first additional network unit and a second additional network unit over an additional network, and the slave network unit coupled to the first additional network unit over a second network comprising:
a master interface unit for sending a master message from the master network unit to the slave network unit, the master message is based on a master downstream delay; and
wherein:
the slave network unit is for;
calculating a master-slave time of day offset with a first difference of a master physical length of the first network and a slave physical length of the first network, a product of a downstream index of refraction of the first network and the first difference, a second difference of the master downstream delay and a slave downstream delay, and an addition of the product and the second difference, and
calculating a slave local time based on the master message; and the first additional network unit is for receiving the slave local time.

48. The system as claimed in claim 47 wherein the first additional network unit is for sending the slave local time through the additional network line terminal to the second additional network unit.

* * * * *